(12) United States Patent
Matsubara et al.

(10) Patent No.: US 8,055,416 B2
(45) Date of Patent: Nov. 8, 2011

(54) SYSTEM AND METHOD FOR CONTROLLING POWER TRANSMISSION APPARATUS FOR VEHICLE

(75) Inventors: Tooru Matsubara, Toyota (JP); Kenta Kumazaki, Toyota (JP); Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 436 days.

(21) Appl. No.: 12/314,409

(22) Filed: Dec. 10, 2008

(65) Prior Publication Data

US 2009/0157269 A1 Jun. 18, 2009

(30) Foreign Application Priority Data

Dec. 13, 2007 (JP) ................... 2007-322643

(51) Int. Cl.
*G06F 19/00* (2011.01)
*G06F 7/00* (2006.01)
*G06F 17/00* (2006.01)

(52) U.S. Cl. ........... 701/54; 701/51; 903/915; 180/65.1; 180/65.21; 180/65.28

(58) Field of Classification Search ............. 903/905, 903/906, 915, 919, 930; 701/51, 54, 55, 701/56, 64; 475/4, 5; 180/65.1, 65.6, 65.7
See application file for complete search history.

(56) References Cited

U.S. PATENT DOCUMENTS

| | | | | |
|---|---|---|---|---|
| 6,456,918 B2 * | 9/2002 | Nanri | ................ | 701/51 |
| 6,544,141 B1 * | 4/2003 | Fuchs et al. | ................ | 477/44 |
| 7,115,064 B2 * | 10/2006 | Masterson et al. | ................ | 477/3 |
| 7,761,211 B2 * | 7/2010 | Hofmann | ................ | 701/51 |
| 7,766,107 B2 * | 8/2010 | Joe et al. | ................ | 180/65.21 |
| 2007/0197336 A1 * | 8/2007 | Tabata et al. | ................ | 475/150 |
| 2007/0221421 A1 * | 9/2007 | Tanishima | ................ | 180/65.2 |
| 2008/0059032 A1 * | 3/2008 | Hofmann | ................ | 701/55 |
| 2008/0176708 A1 * | 7/2008 | Tamai et al. | ................ | 477/125 |

FOREIGN PATENT DOCUMENTS

| | | |
|---|---|---|
| JP | A-4-73462 | 3/1992 |
| JP | A-10-2241 | 1/1998 |
| JP | A-2004-60732 | 2/2004 |
| JP | A-2005-319924 | 11/2005 |
| JP | A-2006-94617 | 4/2006 |
| JP | A-2006-205880 | 8/2006 |

* cited by examiner

*Primary Examiner* — Hussein Elchanti
*Assistant Examiner* — Rami Khatib
(74) *Attorney, Agent, or Firm* — Oliff & Berridge, PLC

(57) ABSTRACT

A control method for an apparatus which includes a first shift portion that includes a motor and a differential portion, and that is able to function as an electric differential portion; and a second shift portion that is a stepped shift portion, and that is connected to the first shift portion, wherein the apparatus transmits power output from an engine to a drive wheel, the control method includes: determining whether a degree of progress of an upshift of the second shift portion that is performed when a vehicle is driven using solely the motor as a drive power source, has reached a predetermined level; determining whether the engine should be started; and stopping the upshift, and starting the engine, when it is determined that the degree of the progress of the upshift has not reached the predetermined level, and it is determined that the engine should be started.

15 Claims, 11 Drawing Sheets

|  | C1 | C2 | B1 | B2 | B3 | SPEED RATIO | STEP |
|---|---|---|---|---|---|---|---|
| 1st | O |  |  |  | O | 3.357 | 1.54 |
| 2nd | O |  |  | O |  | 2.180 | 1.53 |
| 3rd | O | O |  |  |  | 1.424 | 1.42 |
| 4th | O | O |  |  |  | 1.000 | TOTAL 3.36 |
| R |  | O |  |  | O | 3.209 |  |
| N |  |  |  |  |  |  |  |

O ENGAGED

F I G . 10
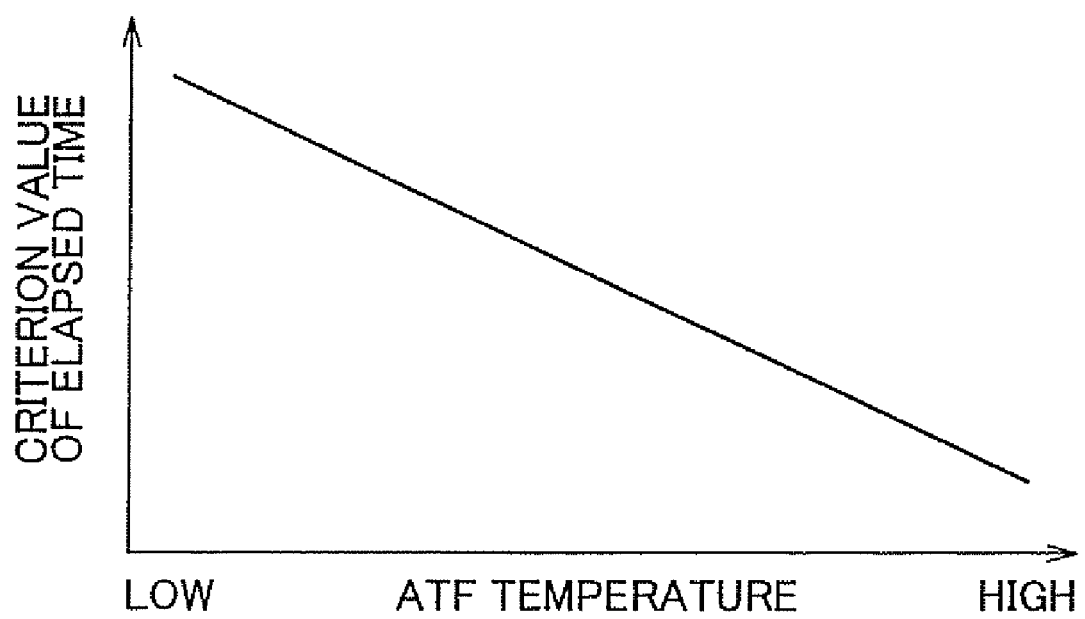

SYSTEM AND METHOD FOR CONTROLLING POWER TRANSMISSION APPARATUS FOR VEHICLE

INCORPORATION BY REFERENCE

The disclosure of Japanese Patent Application No. 2007-322643 filed on Dec. 13, 2007 including the specification, drawings and abstract is incorporated herein by reference in its entirety.

BACKGROUND OF THE INVENTION

1. Field of the Invention

The invention relates to a system and a method for controlling a power transmission apparatus for a vehicle, which includes a first shift portion that is able to function as an electric differential portion, and a second shift portion that is a stepped shift portion, and that is connected to the first shift portion. More specifically, the invention relates to improvement for reducing the possibility that a driver feels that drive power is not quickly increased, and the drive power is insufficient when the driver depresses an accelerator pedal.

2. Description of the Related Art

A power transmission apparatus, which includes a first shift portion and a second shift portion connected to the first shift portion, and which transmits power output from the engine to drive wheels, is available. The first shift portion includes a motor and a differential portion, and is able to function as an electric differential portion. The second shift portion is a stepped shift portion. For example, Japanese Patent Application Publication No. 2005-319924. (JP-A-2005-319924) describes a control device for a drive apparatus for a vehicle. The drive apparatus for a vehicle in the technology includes a first shift portion that is able to function as an electric continuously variable transmission, and a second shift portion in which any one of a plurality of gears is achieved. The first shift portion is connected to the second shift portion in series. The mode of the first shift portion is selectively switched between a CVT mode in which electric CVT operation is performed, and a stepped transmission mode in which the CVT operation is not performed. The control device separately controls the speed ratio of the first shift portion, and the speed ratio of the second shift portion. In addition, the control device changes, in a stepwise manner, the speed ratio (total speed ratio) of an entire transmission constituted by the first shift portion and the second shift portion. Also, the drive apparatus for a vehicle selectively switches the drive mode of a vehicle among an engine-drive mode in which an engine is solely used as a drive power source, an engine-and-motor-drive mode in which the engine and a motor are used as the drive power sources, and a motor-drive mode in which the motor is solely used as the drive power source.

However, in the above-described control in the related art, when it is determined that the engine should be started based on depression of an accelerator pedal after an upshift is started while the vehicle is driven in the motor-drive mode using solely the motor as the drive power source, the start of the engine is delayed until the upshift is completed. Therefore, drive power corresponding to the depression of the accelerator pedal may not be quickly output, and accordingly, a driver may feel that the drive power is not quickly increased, and the drive power is insufficient.

SUMMARY OF THE INVENTION

The invention provides a control system and a control method for a power transmission apparatus for a vehicle, which reduce the possibility that a driver feels that drive power is not quickly increased, and the drive power is insufficient when the driver depresses an accelerator pedal.

A first aspect of the invention relates to a control system. The control system includes a power transmission apparatus that includes an engine; a first shift portion that includes a motor and a differential portion, and that is able to function as an electric differential portion; and a second shift portion that is a stepped shift portion, and that is connected to the first shift portion, wherein the power transmission apparatus transmits power output from the engine to a drive wheel; and a control device that includes a shift progress determination portion that determines whether a degree of progress of an upshift of the second shift portion that is performed when a vehicle is driven using solely the motor as a drive power source, has reached a predetermined level, wherein the control device determines whether the engine should be started; and when the upshift of the second shift portion is being performed, the shift progress determination portion determines that the degree of the progress of the upshift has not reached the predetermined level, and the control device determines that the engine should be started, the control device executes a control that stops the upshift, and starts the engine.

With the above-described configuration, even when the upshift of the second shift portion is being performed, it is possible to quickly output the drive power according to the depression of the accelerator pedal. That is, it is possible to provide the system for controlling the power transmission apparatus for a vehicle, which reduces the possibility that the driver feels that the drive power is not quickly increased, and the drive power is insufficient when the driver depresses the accelerator pedal.

In the control system according to the aspect, when the vehicle is driven using solely the motor as the drive power source, the upshift of the second shift portion is being performed, the shift progress determination portion determines that the degree of the progress of the upshift has not reached the predetermined level, and the control device determines that the engine should be started, the control device may execute a control that stops the upshift, starts, a downshift of the second shift portion, and starts the engine.

With the above-described configuration, even when the upshift of the second shift portion is being performed, it is possible to quickly output the drive power according to the depression of the accelerator pedal. That is, it is possible to provide the system for controlling the power transmission apparatus for a vehicle, which reduces the possibility that the driver feels that the drive power is not quickly increased, and the drive power is insufficient when the driver depresses the accelerator pedal.

In the control system according to the aspect, if an inertia phase of the upshift has not started, the shift progress determination portion may determine that the degree of the progress of the upshift has not reached the predetermined level. With the above-described configuration, if the inertia phase of the upshift has not started, the rotational speed of the member of the second shift portion has not changed, and therefore, it is possible to determine that a shock will not occur even if the upshift is stopped. Thus, if the inertia phase of the upshift has not started, the upshift is stopped, and the engine is started. If the inertia phase of the upshift has started, the upshift is continued. Thus, it is possible to appropriately suppress occurrence of a shock.

In the control system according to the aspect, if a torque capacity of an engagement element to be disengaged during the upshift is equal to or larger than a predetermined value, the shift progress determination portion may determine that the degree of the progress of the upshift has not reached the predetermined level. With the configuration, if the torque capacity of the engagement element to be disengaged during the upshift is equal to or larger than the predetermined value, it is possible to determine that a shock will not occur even if the upshift is stopped, and therefore, the upshift is stopped, and the engine is started. If the torque capacity of the engagement element to be disengaged during the upshift is smaller than the predetermined value, the upshift is continued. Thus, it is possible to appropriately suppress occurrence of a shock.

In the control system according to the aspect, if an elapsed time after start of the upshift is shorter than a predetermined time, the shift progress determination portion may determine that the degree of the progress of the upshift has not reached the predetermined level. With the configuration, if the elapsed time after the start of the upshift is shorter than the predetermined time, it is possible to determine that a shock will not occur even if the upshift is stopped, and therefore, the upshift is stopped, and the engine is started. If the elapsed time after the start of the upshift is equal to or longer than the predetermined time, the upshift is continued. Thus, it is possible to appropriately suppress occurrence of a shock.

In the control system awarding to the aspect, if an elapsed time after start of an inertia phase of the upshift is shorter than a predetermined time, the shift progress determination portion may determine that the degree of the progress of the upshift has not reached the predetermined level. With the configuration, if the elapsed time after the start of the inertia phase of the upshift is shorter than the predetermined time, it is possible to determine that a shock will not occur even if the upshift is stopped, and therefore, the upshift is stopped, and the engine is started. If the elapsed time after the start of the inertia phase of the upshift is equal to or longer than the predetermined time, the upshift is continued. Thus, it is possible to appropriately suppress occurrence of a shock.

In the control system according to the aspect, the degree of the progress of the upshift may be determined based on an amount of change in a rotational speed of a member of the second shift portion. With the configuration, it is possible to determine the progress of the upshift in a practical manner.

In the control system according to the aspect, a criterion used to determine the degree of the progress of the upshift may be changed based on a temperature of oil in the second shift portion. With the configuration, it is possible to determine the progress of the upshift in a practical manner.

In the control system according to the aspect, the control device may determine whether the engine should be started based on an amount of depression of an accelerator pedal. With the configuration, it is possible to determine whether the engine should be started in a practical manner.

In the control system according to the aspect, the second shift portion may automatically shift according to a traveling state of the vehicle. With the configuration, when employing the power transmission apparatus for a vehicle, which includes a practical stepped automatic shift portion, it is possible to reduce the possibility that the driver feels that the drive power is not quickly increased, and the drive power is insufficient when the driver depresses the accelerator pedal.

In the control system according to the aspect, the first shift portion may include a planetary gear unit, and the two motors connected to rotational elements of the planetary gear unit. With the configuration, when employing the power transmission apparatus for a vehicle, which includes the practical first shift portion, it is possible to reduce the possibility that the driver feels that the drive power is not quickly increased, and the drive power is insufficient when the driver depresses the accelerator pedal.

A second aspect of the invention relates to a control method for a power transmission apparatus for a vehicle, which includes a first shift portion that includes a motor and a differential portion, and that is able to function as an electric differential portion; and a second shift portion that is a stepped shift portion, and that is connected to the first shift portion. The power transmission apparatus transmits power output from an engine to a drive wheel. The control method includes determining whether a degree of progress of an upshift of the second shift portion that is performed when a vehicle is driven using solely the motor as a drive power source, has reached a predetermined level; determining whether the engine should be started; and stopping the upshift, and starting the engine, when it is determined that the degree of the progress of the upshift has not reached the predetermined level, and it is determined that the engine should be started.

The control method according to the aspect may further include stopping the upshift, starting a downshift of the second shift portion, and starting the engine.

The control method according to the aspect may repeatedly executed in predetermined intervals.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 1 is a schematic diagram explaining the configuration of a power transmission apparatus for a vehicle, to which the invention is applied;

FIG. 2 is an operation table explaining operations of hydraulic frictional engagement devices when a plurality of gears are achieved in an automatic shift portion of the power transmission apparatus shown in FIG. 1;

FIG. 10 is a diagram showing an example of a relation between the temperature of oil in the automatic shift portion, and a criterion value of an elapsed time after start of a shift, which is one example of the criterion value used to determine the degree of the progress of the shift, the relation being used for determination of the degree of the progress of the shift in the shift-time engine start control executed by the electronic control unit shown in FIG. 4;

DETAILED DESCRIPTION OF EMBODIMENTS

Figure 3:
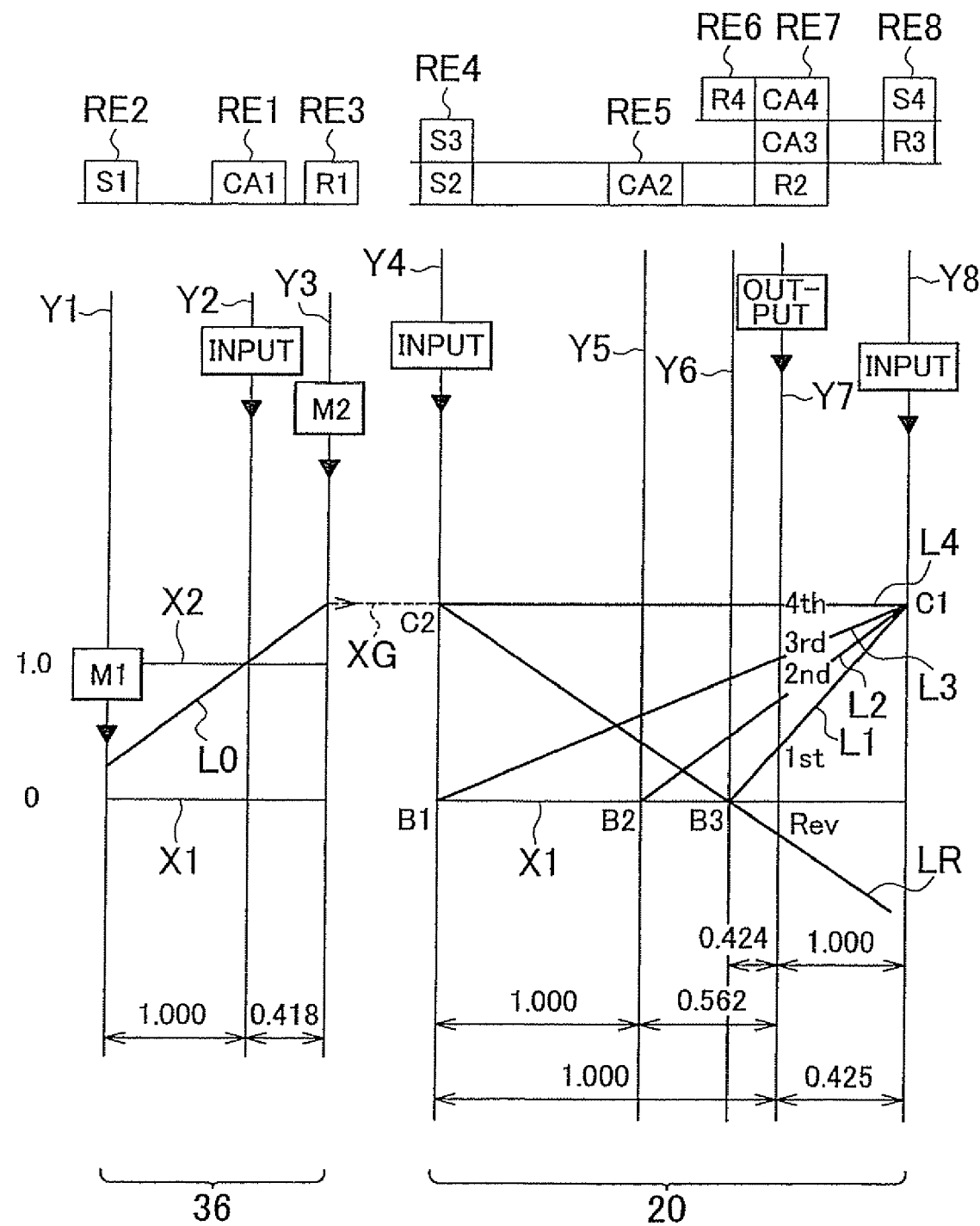
FIG. 3 is a collinear diagram in which straight lines indicate relative relations among rotational speeds of rotational elements in a differential portion and an automatic shift portion of the power transmission apparatus shown in FIG. 1, each of the rotational elements being in a connected state or disconnected state at each gear.

Hereinafter, an embodiment of the invention will be described in detail with reference to the drawings.

FIG. 1 is a schematic diagram explaining a power transmission apparatus 10 for a vehicle, to which the invention is applied. For example, the power transmission apparatus 10 is provided in a front-engine rear-wheel-drive vehicle where an engine is longitudinally disposed. The power transmission apparatus 10 includes an input shaft 14, a differential portion 16, an automatic shift portion 20, and an output shaft 22 that are provided in series on a common axis in a transmission case (hereinafter, simply referred to as "case") 12. The transmission case 12, which is a non-rotational member, is fitted to a vehicle body. The differential portion 16 is directly connected to the input shaft 14, or connected to the input shaft 14 via a pulsation absorption damper (i.e., a vibration-damping device; not shown) or the like. The automatic shift portion 20 is provided in a power transmission path between the differential portion 16 and drive wheels 34 (refer to FIG. 6), and connected to the differential portion 16 in series via a transmitting member (transmitting shaft) 18. The output shaft 22 is connected to the automatic shift portion 20. Drive power (rotational torque) output from the differential portion 16 is transmitted to the automatic shift portion 20 via the transmitting member 18. That is, the transmitting member 18 functions as an output rotational element of the differential portion 16, and as an input rotational element of the automatic shift portion 20.

In the power transmission apparatus 10, an engine 8, which is a main drive power source for driving the vehicle, is provided. An output shaft (crankshaft) of the engine 8 is directly connected to the input shaft 14, or connected to the input shaft 14 via the pulsation absorption damper (not shown). For example, the engine 8 is an internal combustion engine in which fuel injected to cylinders is combusted to generate the drive power, such as a gasoline engine or a diesel engine. A differential gear unit (final reducer) 32 (refer to FIG. 6), which constitutes a part of the power transmission path, is provided between the engine 8 and the pair of the drive wheels 34. The drive power output from the engine 8 is transmitted to the drive wheels 34 via the differential portion 16, the automatic shift portion 20, the differential gear unit 32, a pair of axles, and the like. Thus, the engine 8 is directly connected to the differential portion 16 in the power transmission apparatus 10 in the embodiment. That is, the engine 8 is connected to the differential portion 16 without providing a fluid transmission device such as a torque converter or a fluid coupling between the engine 8 and the differential portion 16. For example, when the engine 8 is connected to the differential portion 16 via the above-described pulsation absorption damper, it is regarded that the engine 8 is directly connected to the differential portion 16. Because the configuration of the power transmission apparatus 10 is symmetric with respect to the axis thereof, the lower portion of the power transmission apparatus 10 is omitted in the schematic diagram in FIG. 1.

The differential portion 16 includes a first motor M1, a second motor M2, and a first planetary gear unit 24 of a single pinion type. By controlling the operating state of the first motor M1, a difference between an input rotational speed and an output rotational speed is controlled. The first motor M1 is connected to a first sun gear S1 (a second rotational element RE2) that is a rotational element of the first planetary gear unit 24. The second motor M2 is connected to a first ring gear R1 (a third rotational element RE3) of the first planetary gear unit 24. The first ring gear R1 is rotated integrally with the transmitting member 18. In other words, the differential portion 16 is a mechanical mechanism that mechanically distributes the output from the engine 8, which is input to the input shaft 14. The differential portion 16 constitutes a power split mechanism 36 that is a differential mechanism that distributes the output from the engine 8 to the first motor M1 and the transmitting member 18. Each of the first motor M1 and the second motor M2 may be a so-called motor-generator that has a motor function of generating mechanical drive power using electric energy, and a power-generation function of generating electric energy using the mechanical drive power. The first motor M1 has at least the power-generation function for bearing a reaction force. The second motor M2 has at least the motor function for outputting the drive power as the drive power source for driving the vehicle. That is, in the power transmission apparatus 10, the second motor M2 functions as a drive power source in place of the engine 8 that is a main power source, or functions as a drive power source (auxiliary drive power source) that generates the drive power for driving the vehicle together with the engine 8. Hereinafter, the first motor M1 and the second motor M2 may be collectively referred to as "motors M" when the first motor M1 and the second motor M2 are not distinguished from each other.

The first planetary gear unit 24 has a predetermined gear ratio $\rho 1$ of, for example, approximately "0.418". The power split mechanism 36 mainly includes the first planetary gear unit 24 and the motors M connected to the rotational elements of the first planetary gear unit 24. The first planetary gear unit 24 includes the first sun gear S1, a first planetary gear P1, a first carrier CA1, and the first ring gear R1, which are rotational elements (elements). The first carrier CA1 supports the first planetary gear P1 so that the first planetary gear P1 rotates on its axis, and moves around the first sun gear S1. The first ring gear R1 engages with the first sun gear S1 via the first planetary gear P1. The gear ratio $\rho 1$ is equal to ZS1/ZR1. In this equation, ZS1 represents the number of teeth of the first sun gear S1, and ZR1 represents the number of teeth of the first ring gear R1.

In the power split mechanism 36, the first carrier CA1 is connected to the input shaft 14, that is, the engine 8. The first sun gear S1 is connected to the first motor M1. The first ring gear R1 is connected to the transmitting member 18. When the three elements of the first planetary gear unit 24, that is, the first sun gear S1, the first carrier CA1, and the first ring gear R1 can be rotated relative to each other, the power split mechanism 36 with the above-described configuration is placed in a differential mode in which the differential action can be performed, that is, the differential action is performed. Thus, the drive power output from the engine 8 is distributed to the first motor M1 and the transmitting member 18. Also, electric energy is generated by the first motor M1 using part of the drive power from the engine 8 distributed to the first motor M1, and the second motor M2 is rotated using the generated electric energy. Thus, the differential portion 16 (the power split mechanism 36) functions as an electric differential device. Accordingly, for example, the differential portion 16 is placed in a so-called continuously-variable transmission (CVT) mode (electric CVT mode). That is, the differential portion 16 continuously changes the rotational speed of the transmitting member 18, regardless of the rotational speed of the engine 8. Thus, the differential portion 16 may be regarded as the first shift portion that is able to function as the electric differential portion (the electric CVT) in which a speed ratio $\gamma 0$ (the rotational speed $N_{IN}$ of the input shaft 14/the rotational speed $N_{18}$ of the transmitting member 18) is continuously changed from the minimum value $\gamma 0$ min to the maximum value $\gamma 0$ max.

The automatic shift portion 20 includes a second planetary gear unit 26 of a single pinion type, a third planetary gear unit 28 of a single pinion type, and a fourth planetary gear unit 30 of a single pinion type. The automatic shift portion 20 is a planetary gear type automatic transmission that functions as the second shift portion that is a stepped shift portion. The automatic shift portion 20 also function as a mechanical power transmission portion which is connected to the power split mechanism 36, and which transmits the power output from the power split mechanism 36 to the drive wheels 34. The power split mechanism 36 may be regarded as the first shift portion. The second planetary gear unit 26 includes a second sun gear S2, a second planetary gear P2, a second carrier CA2, and a second ring gear R2. The second carrier CA2 supports the second planetary gear P2 such that the second planetary gear P2 rotates on its axis, and moves around the second sun gear S2. The second ring gear R2 engages with the second sun gear S2 via the second planetary gear P2. The second planetary gear unit 26 has a predetermined gear ratio $\rho 2$ of, for example, approximately "0.562". The third planetary gear unit 28 includes a third sun gear S3, a third planetary gear P3, a third carrier CA3, and a third ring gear R3. The third carrier CA3 supports the third planetary gear P3 such that the third planetary gear P3 rotates on its axis, and moves around the third sun gear S3. The third ring gear R3 engages with the third sun gear S3 via the third planetary gear P3. The third planetary gear unit 28 has a predetermined gear ratio $\rho 3$ of, for example, approximately "0.425". The fourth planetary gear unit 30 includes a fourth sun gear S4, a fourth planetary gear P4, a fourth carrier CA4, and a fourth ring gear R4. The fourth carrier CA4 supports the fourth planetary gear P4 such that the fourth planetary gear P4 rotates on its axis, and moves around the fourth sun gear S4. The fourth ring gear R4 engages with the fourth sun gear S4 via the fourth planetary gear P4. The fourth planetary gear unit 30 has a predetermined gear ratio $\rho 4$ of, for example, approximately "0.421". The gear ratio $\rho 2$ is equal to ZS2/ZR2. In this equation, ZS2 represents the number of teeth of the second sun gear S2, and ZR2 represents the number of teeth of the second ring gear R2. The gear ratio $\rho 3$ is equal to ZS3/ZR3. In this equation, ZS3 represents the number of teeth of the third sun gear S3. ZR3 represents the number of teeth of the third ring gear R3. The gear ratio $\rho 4$ is equal to ZS4/ZR4. In this equation, ZS4 represents the number of teeth of the fourth sun gear S4. ZR4 represents the number of teeth of the fourth ring gear R4.

The automatic shift portion 20 includes a first clutch C1, a second clutch C2, a first brake B1, a second brake B2, and a third brake B3 (hereinafter, collectively referred to as "clutches C" and "brakes B" unless a specific clutch of a specific brake needs to be distinguished from the other clutches or the other brakes). The clutches C and the brakes B may be hydraulic frictional engagement devices that function as engagement elements generally used in vehicular automatic transmissions in related technologies. Each of the clutches C and the brakes B may be a wet multiple disc type clutch or brake in which a plurality of stacked frictional plates are pressed by a hydraulic actuator. Each of the brakes B may be a band brake in which one or two bands is (are) wound around the outer peripheral surface of a drum that is rotated, and the end(s) of the one or two bands is (are) tightened by a hydraulic actuator. Each of the clutches C and the brakes B selectively connects members that are provided on both sides thereof.

In the automatic shift portion 20 with the above-described configuration, the second sun gear S2 and the third sun gear S3, which are integrally connected to each other, are selectively connected to the transmitting member 18 via the second clutch C2. Also, the second sun gear S2 and the third sun gear S3 are selectively connected to the case 12 via the first brake B1. The second carrier CA2 is selectively connected to the case 12 via the second brake B2. The fourth ring gear R4 is selectively connected to the case 12 via the third brake B3. The second ring gear R2, the third carrier CA3, and the fourth carrier CA4, which are integrally connected to each other, are connected to the output shaft 22. The third ring gear R3 and the fourth sun gear S4, which are integrally connected to each other, are selectively connected to the transmitting member 18 via the first clutch C1.

Thus, the rotational elements in the automatic shift portion 20 are selectively connected to the differential portion 16 (the transmitting member 18) via the first clutch C1 and/or the second clutch C2 that is used to achieve each gear of the automatic shift portion 20. In other words, each of the first clutch C1 and the second clutch C2 functions as an engagement device that selectively switches the state of the power transmission path between the power split mechanism 36 that may be regarded as the first shift portion, and the automatic shift portion 20 that may be regarded as the second shift portion, that is, the power transmission path between the differential portion 16 (the transmitting member 18) and the drive wheels 34. The state of the power transmission path is selectively switched between a power-transmission permitted state and a power-transmission interrupted state. When the power transmission path is in the power-transmission permitted state, the transmission of power is permitted. When the power transmission path is in the power-transmission interrupted state, the transmission of power is interrupted. That is, when at least one of the first clutch C1 and the second clutch C2 is engaged, the power transmission path is placed in the power-transmission permitted state, and accordingly, the vehicle is in a driven state. When the first clutch C1 and the second clutch C2 are disengaged, the power transmission path is placed in the power-transmission interrupted state, and accordingly, the vehicle is in a non-driven state.

When a hydraulic frictional engagement device, which needs to be disengaged, is disengaged, and a hydraulic frictional engagement device, which needs to be engaged, is engaged in the automatic shift portion 20, a clutch-to-clutch shift is performed. As a result, one of the first gear to the fourth gear, or the reverse gear, or the neutral state is selectively achieved. Thus, the speed ratio $\gamma$ (=the rotational speed $N_{IN}$ of the transmitting member 18/the rotational speed $N_{OUT}$ of the output shaft 22) at each gear is achieved. The speed ratio γ changes substantially geometrically. As shown in an engagement operation table in FIG. 2, for example, the first gear, at which a speed ratio γ1 is set to the maximum value, for example, approximately "3.357", is achieved by engaging the first clutch C1 and the third brake B3. The second gear, at which a speed ratio γ2 is set to a value smaller than the speed ratio γ1, for example, approximately "2.180", is achieved by engaging the first clutch C1 and the second brake B2. The third gear, at which a speed ratio γ3 is set to a value smaller than the speed ratio γ2, for example, approximately "1.424", is achieved by engaging the first clutch C1 and the first brake B1. The fourth gear, at which a speed ratio γ4 is set to a value smaller than the speed ratio γ3, for example, approximately "1.000", is achieved by engaging the first clutch C1 and the second clutch C2. The "reverse gear", at which a speed ratio γR is set to a value between the speed ratios γ1 and γ2, for example, approximately "3.209", is achieved by engaging the second clutch C2 and the third brake B3. The neutral state "N" is achieved by disengaging the first clutch C1, the second clutch C2, the first brake B1, the second brake B2, and the third brake B3.

In the power transmission apparatus 10 with the above-described configuration, the CVT is formed by combining the power split mechanism 36 that functions as the electric CVT with the automatic shift portion 20 that functions as the mechanical stepped transmission. When the speed ratio of the power split mechanism 36 is controlled to be constant, the stepped transmission is substantially formed by combining the power split mechanism 36 with the automatic shift portion 20. More specifically, when the power split mechanism 36 functions as the CVT, and the automatic shift portion 20, which is connected to the power split mechanism 36 in series, functions as the stepped transmission, the rotational speed input to the automatic shift portion 20 at least one gear of the automatic shift portion 20, that is, the rotational speed of the transmitting member 18 is continuously changed. As a result, the speed ratio is continuously changed in a certain range at the at least one gear. Accordingly, the total speed ratio γT of the power transmission apparatus 10 (=the rotational speed $N_{IN}$ of the input shaft 14/the rotational speed $N_{OUT}$ of the output shaft 22) is continuously changed. Thus, the CVT is formed in the power transmission apparatus 10. The total speed ratio γT of the power transmission apparatus 10 is determined based on the speed ratio γ0 of the differential portion 16 and the speed ratio γ of the automatic shift portion 20.

For example, the rotational speed of the transmitting member 18 is continuously changed at each of the first gear to the fourth gear, and the reverse gear of the automatic shift portion 20 shown in the engagement operation table in FIG. 2. Thus, the speed ratio is continuously changed in a certain range at each of the first gear to the fourth gear, and the reverse gear. As a result, the speed ratio is continuously changed between the first gear and the second gear, between the second gear and the third gear, and between the third gear and the fourth gear. Accordingly, the total speed ratio γT of the entire power transmission apparatus 10 is continuously changed. When the speed ratio of the power split mechanism 36 is controlled to be constant, and the clutches C and the brakes B are selectively engaged to achieve any one of the first gear to the fourth gear, and the reverse gear, the total speed ratio γT of the entire power transmission apparatus 10 at each gear is achieved. The total speed ratio γT changes substantially geometrically. Accordingly, in the power transmission apparatus 10, the stepped transmission is substantially formed. For example, when the speed ratio γ0 of the power split mechanism 36 is controlled to be fixed to "1", the total speed ratio γT of the power transmission apparatus 10 at each of the first gear to the fourth gear, and the reverse gear of the automatic shift portion 20 is achieved, as shown in the engagement operation table in FIG. 2. When the speed ratio γ0 of the power split mechanism 36 is fixed to a value smaller than "1", for example, approximately 0.7, at the fourth gear of the automatic shift portion 20, the total speed ratio γT is set to a value smaller than "1" at the fourth gear, for example, approximately "0.7".

FIG. 3 is a collinear diagram in which straight lines indicate relative relations among the rotational speeds of the rotational elements in the power transmission apparatus 10 that includes the power split mechanism 36 and the automatic shift portion 20. Each of the rotational elements is in a connected state or disconnected state at each gear. The collinear diagram in FIG. 3 is a two-dimensional coordinate. In the collinear diagram in FIG. 3, the axis of abscissa indicates a relation among the gear ratios ρ (ρ1, ρ2, ρ3, and ρ4) of the first planetary gear unit 24, the second planetary gear unit 26, the third planetary gear unit 28, and the fourth planetary gear unit 30, and the axis of ordinate indicates relative rotational speeds. The horizontal line X1 indicates the rotational speed of "0". The horizontal line X2 indicates the rotational speed of "1.0", that is, the rotational speed $N_E$ the engine 8 connected to the input shaft 14. The horizontal line XG indicates the rotational speed of the transmitting member 18. The three vertical lines Y1, Y2, and Y3 indicate the relative rotational speeds of the three rotational elements of the differential portion 16 that constitutes the power split mechanism 36. That is, the vertical line Y1 indicates the relative rotational speed of the first sun gear S1 that is regarded as the second rotational element (second element) RE2. The vertical line Y2 indicates the relative rotational speed of the first carrier CA1 that is regarded as a first rotational element (first element) RE1. The vertical line Y3 indicates the relative rotational speed of the first ring gear R1 that is regarded as the third rotational element (third element) RE3. The intervals between the vertical lines Y1 and Y2, and between the vertical lines Y2 and Y3 are set based on the gear ratio ρ1 of the first planetary gear unit 24. Further, the five vertical lines Y4, Y5, Y6, Y7, and Y8 indicate the relative rotational speeds of the rotational elements of the automatic shift portion 20. That is, the vertical line Y4 indicates the relative rotational speed of the second sun gear S2 and the third sun gear S3, which are connected to each other, and which are regarded as a fourth rotational element (fourth element) RE4. The vertical line Y5 indicates the relative rotational speed of the second carrier CA2 that is regarded as a fifth rotational element (fifth element) RE5. The vertical line Y6 indicates the relative rotational speed of the fourth ring gear R4 that is regarded as a sixth rotational element (sixth element) RE6. The vertical line Y7 indicates the relative rotational speed of the second ring gear R2, the third carrier CA3, and the fourth carrier CA4, which are connected to each other, and which are regarded as a seventh rotational element (seventh element) RE7. The vertical line Y8 indicates the relative rotational speed of the third ring gear R3 and the fourth sun gear S4, which are connected to each other, and which are regarded as an eighth rotational element (eighth element) RE8. The intervals between the vertical lines are set based on the gear ratios ρ2 of the second planetary gear unit 26, the gear ratio ρ3 of the third planetary gear unit 28, and the gear ratio ρ4 of the fourth planetary gear unit 30. In the collinear diagram, the interval between the sun gear and the carrier is set to indicate "1". The interval between the carrier and the ring gear is set to indicate the gear ratio ρ (ρ1, ρ2, ρ3, or ρ4). That is, in the power split mechanism 36, the interval between the vertical lines Y1 and Y2 is set to indicate "1", and the interval between the vertical lines Y2 and Y3 is set to indicate the gear ratio ρ1. In the automatic shift portion 20, the interval between the sun gear and the carrier in each of the second planetary gear unit 26, the third planetary gear unit 28, and the fourth planetary gear unit 30 is set to indicate "1". The interval between the carrier and the ring gear in each of the second planetary gear unit 26, the third planetary gear unit 28, and the fourth planetary gear unit 30 is set to indicate the gear ratio ρ (ρ2, ρ3, or ρ4).

As shown in the collinear diagram in FIG. 3, in the power splint mechanism 36 (the differential portion 16) in the power transmission apparatus 10 in the embodiment, the first rotational element RE1 (the first carrier CA1) of the first planetary gear unit 24 is connected to the input shaft 14, that is, the output shaft of the engine 8. The second rotational element RE2 is connected to the first motor M1. The third rotational element (the first ring gear R1) RE3 is connected to the transmitting member 18 and the second motor M2. Thus, the rotation of the input shaft 14 is transmitted (input) to the automatic shift portion 20 via the transmitting member 18. In FIG. 3, the oblique straight line L0 that passes through the intersection of the lines Y2 and X2 indicates a relation between the rotational speed of the first sun gear S1 and the rotational speed of the first ring gear R1. For example, the power split mechanism 36 may be placed in the differential mode so that the first rotational element RE1 to the third rotational element RE3 can be rotated relative to each other, and the rotational speed of the first ring gear R1, which depends on the vehicle speed V, may be substantially constant. In this case, when the rotational speed of the first carrier CA1 is increased or decreased by controlling the engine speed $N_E$, the rotational speed of the first sun gear S1, that is, the rotational speed of the first motor M1 is increased or decreased. The rotational speed of the first ring gear R1 is indicated by the intersection of the straight line L0 and the vertical line Y3. The rotational speed of the first carrier CA1 is indicated by the intersection of the straight line L0 and the vertical line Y2. The rotational speed of the first sun gear S1 is indicated by the intersection of the straight line L0 and the vertical line Y1. When the rotational speed of the first sun gear S1 is made equal to the engine speed $N_E$ by controlling the rotational speed of the first motor M1 so that the speed ratio γ0 of the power split mechanism 36 is fixed to "1", the straight line L0 matches the horizontal line X2. Thus, the transmitting member 18 is rotated in a manner such that the rotational speed of the first ring gear R1 is equal to the engine speed $N_E$. When the rotational speed of the first sun gear S1 is made 0 by controlling the rotational speed of the first motor M1 so that the speed ratio γ0 of the power split mechanism 36 is fixed to a value smaller than "1", for example, approximately 0.7, the transmitting member 18 is rotated at a speed that is higher than the engine speed $N_E$.

As shown in the collinear diagram in FIG. 3, in the automatic shift portion 20, the fourth rotational element RE4 is selectively connected to the transmitting member 18 via the second clutch C2, and selectively connected to the case 12 via the first brake B1. The fifth rotational element RE5 is selectively connected to the case 12 via the second brake B2. The sixth rotational element RE6 is selectively connected to the case 12 via the third brake B3. The seventh rotational element RE7 is connected to the output shaft 22. The eighth rotational element RE8 is selectively connected to the transmitting member 18 via the first clutch C1. When the straight line L0 matches the horizontal line X2 in the power split mechanism 36, and the rotational speed that is equal to the engine speed $N_E$ is input to the eighth rotational element RE8 from the power split mechanism 36, the rotational speed of the output shaft 22 at the first gear is indicated by the intersection of the oblique straight line L1 and the vertical line Y7 in the automatic shift portion 20, as shown in FIG. 3. The straight line L1 is set by engaging the first clutch C1 and the third brake B3. The straight line L1 passes through the intersection of the vertical line Y8 that indicates the rotational speed of the eighth rotational element RE8 and the horizontal line X2, and the intersection of the vertical line Y6 that indicates the rotational speed of the sixth rotational element RE6 and the horizontal line X1. The vertical line Y7 indicates the rotational speed of the seventh rotational element RE7 connected to the output shaft 22. Similarly, the rotational speed of the output shaft 22 at the second gear is indicated by the intersection of the oblique straight line L2 and the vertical line Y7. The straight line L2 is set by engaging the first clutch C1 and the second brake B2. The rotational speed of the output shaft 22 at the third gear is indicated by the intersection of the oblique straight line l3 and the vertical line Y7. The straight line L3 is set by engaging the first clutch C1 and the first brake B1. The rotational speed of the output shaft 22 at the fourth gear is indicated by the intersection of the horizontal straight line L4 and the vertical line Y7. The straight line L4 is set by engaging the first clutch C1 and the second clutch C2.

Figure 4:
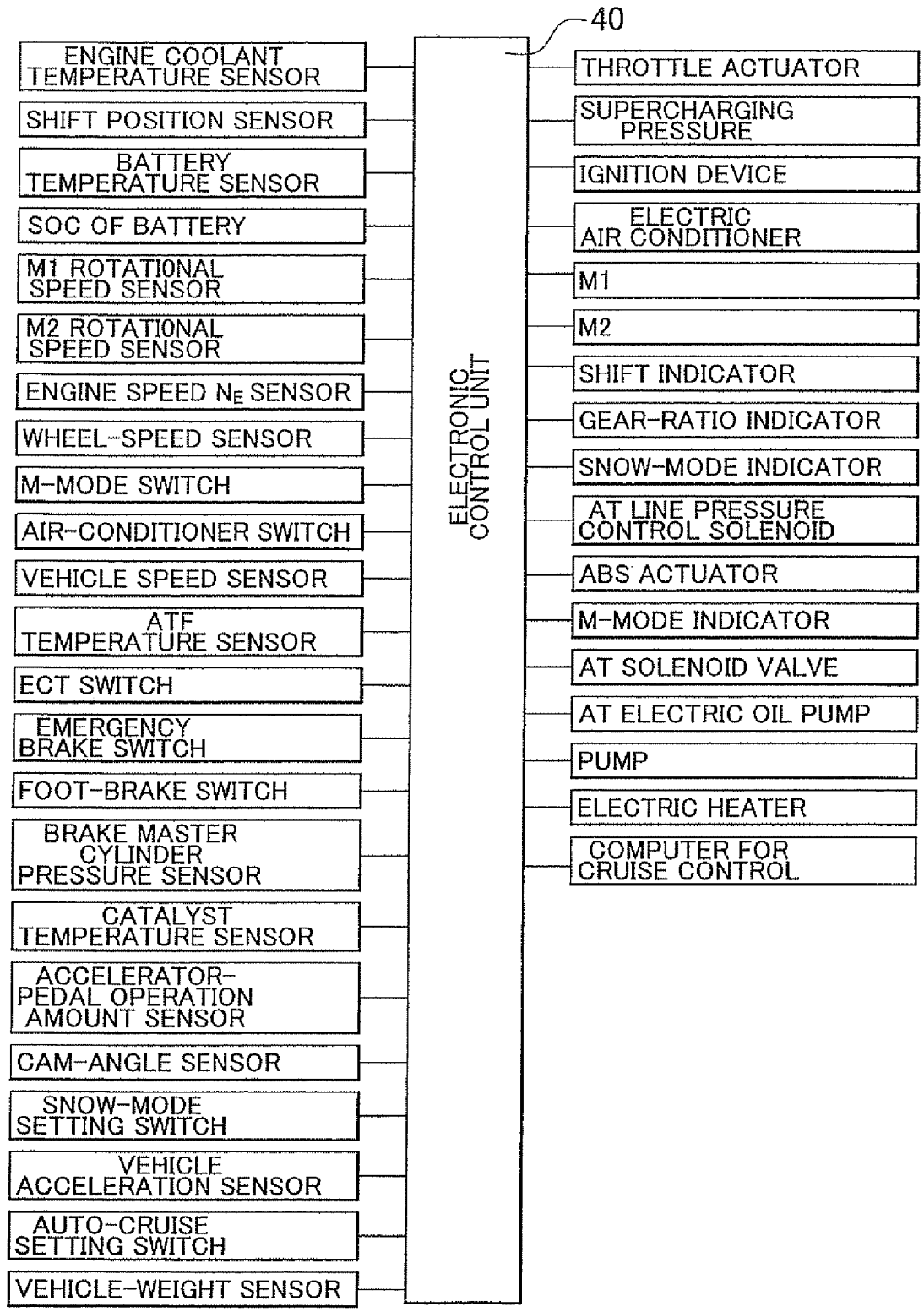
FIG. 4 is a diagram showing examples of signals that are input to, and output from an electronic control unit provided for the power transmission apparatus, to control the power transmission apparatus shown in FIG. 1.

FIG. 4 shows examples of signals that are input to, and output from the electronic control unit 40 provided for the power transmission apparatus 10, to control the power transmission apparatus 10. The electronic control unit 40 includes a so-called microcomputer that includes a CPU, ROM, RAM, and an input/output interface. The electronic control unit 40 executes controls, for example, a drive control on the engine 8, a hybrid drive control using the engine 8, and the first and second motors M1 and M2, and a stepped shift control on the automatic shift portion 20, by processing the signals according to programs that are prestored in the ROM, using the temporary storage function of the RAM.

As shown in FIG. 4, the electronic control unit 40 receives signals relating to the power transmission apparatus 10 from sensors and switches. For example, the electronic control unit 40 receives a signal indicating an engine coolant temperature, a signal indicating a shift position at which a shift lever 52 (refer to FIG. 5) is placed, a signal indicating the number of times that the shift lever 52 is operated at the position "M", a signal indicating the temperature of an electric power storage device 56 (refer to FIG. 6), a signal indicating the state of charge SOC in the electric power storage device 56, a signal indicating the rotational speed $N_{M1}$ of the first motor M1, a signal indicating the rotational speed $N_{M2}$ of the second motor M2, a signal indicating the engine speed $N_E$ that is the rotational speed of the engine 8, a signal indicating the wheel speed of each wheel, a signal indicating the on/off state of a manual mode (manual shift travel mode) switch, a signal indicating the operation of an air conditioner, a signal indicating the rotational speed $N_{OUT}$ of the output shaft 22, which corresponds to the vehicle speed V, a signal indicating the temperature of automatic transmission fluid (ATF) used for control operation for the automatic shift portion 20, a signal indicating the operation of an emergency brake, a signal indicating the operation of a foot brake, a signal indicating a brake master cylinder pressure that corresponds to the operation of the foot brake, a signal indicating a catalyst temperature, a signal indicating the operation amount of the accelerator pedal (i.e., an accelerator-pedal operation amount Acc) that corresponds to the amount of output required by a driver, a signal indicating a cam angle, a signal indicating the setting of a snow mode, a signal indicating longitudinal acceleration G, a signal indicating an auto-cruise mode, and a signal indicating the weight of the vehicle.

The electronic control unit 40 outputs control signals to control the drive of the power transmission apparatus 10. For example, the electronic control unit 40 outputs a drive signal to a throttle actuator 64 to control the throttle-valve opening amount $\theta_{TH}$ of an electronic throttle valve 62 provided in the intake pipe 60 of the engine 8, a fuel-supply amount signal that controls the amount of fuel supplied by a fuel injection device 66 to the intake pipe 60 or the cylinder of the engine 8, and an ignition signal that provides an instruction for the timing at which an ignition device 68 ignites the fuel in the engine 8. The electronic control unit 40 also outputs a super-charging-pressure adjustment signal that adjusts a super-charging pressure, a control signal for an engine output control device 58 (refer to FIG. 6) that controls an engine output, an electric air-conditioner drive signal that operates the electric air conditioner, instruction signals that provide instructions for operating the first motor M1 and the second motor M2, a shift position (operational position) indication signal that operates a shift indicator, a gear-ratio indication signal that causes a gear-ratio indicator to indicate the gear ratio, a snow-mode indication signal that causes a snow-mode indicator to indicate that the snow mode is selected, an ABS operation signal that operates an ABS (anti-locking braking system) actuator that prevents the slip of the wheels at the time of braking, a M-mode indication signal that causes a M-mode indicator to indicate that the M-mode is selected, a valve-instruction signal that operates electromagnetic valves (linear solenoid valves) in a hydraulic control circuit 38 to control hydraulic actuators for the hydraulic frictional engagement devices in the automatic shift portion 20 and the like, a signal that regulates a line pressure $P_L$ (not shown) using a regulator valve provided in the hydraulic control circuit 38, a drive instruction signal that operates an electric oil pump for supplying a hydraulic pressure that is used as a basic pressure when the line pressure $P_L$ (not shown) is regulated, a signal that drives an electric heater, a signal for a computer used for the cruise control, and an output-suppression signal that notifies the driver that the output from the drive power source (hereinafter, referred to as "drive power source output") is being suppressed, for example, the output (power) from the engine and/or the output from the second motor M2 (hereinafter, referred to as "second motor output") and/is being suppressed.

Figure 5:
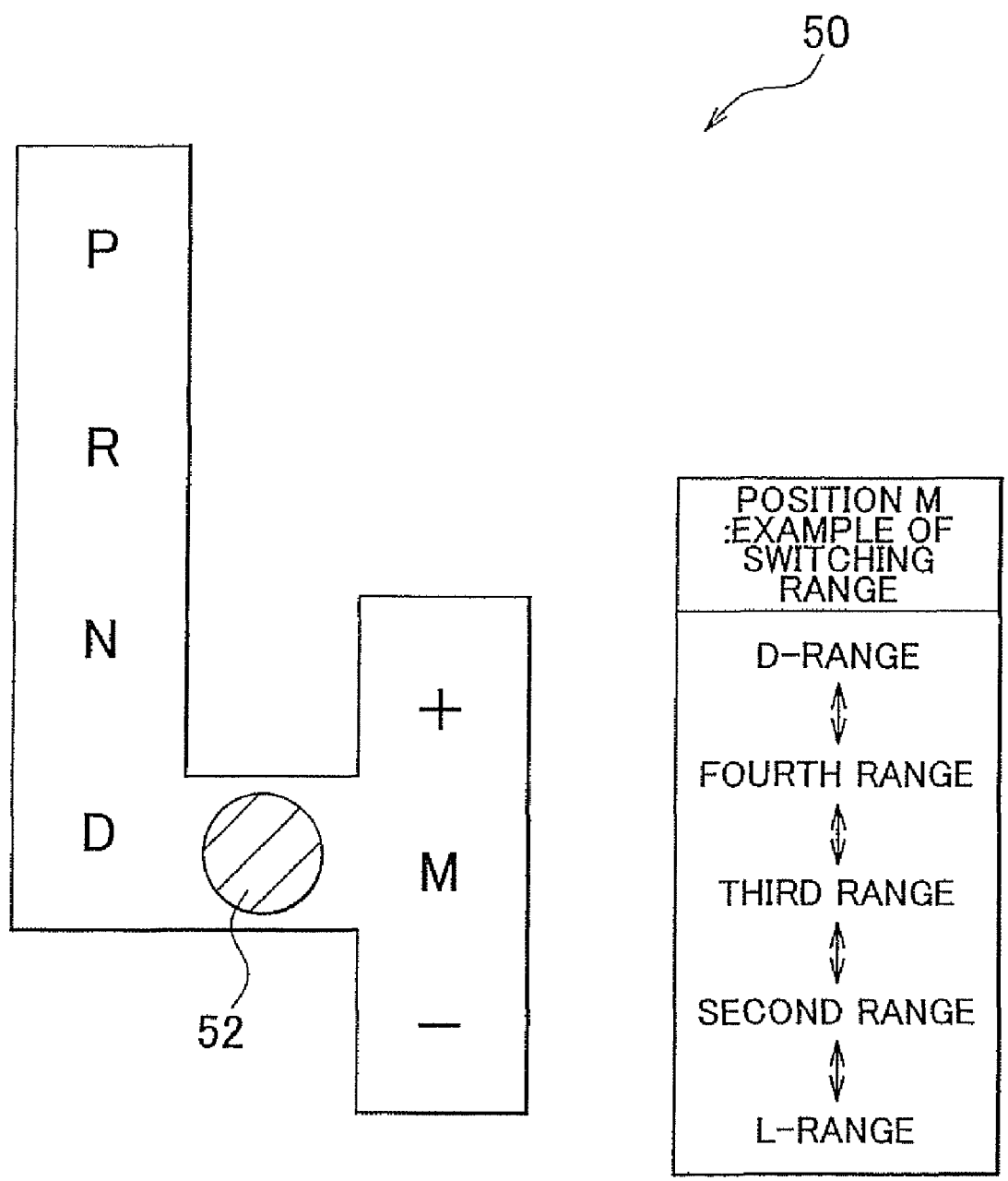
FIG. 5 is a diagram showing an example of a shift operation device that functions as a switching device that switches a shift position among a plurality of positions for the power transmission apparatus shown in FIG. 1 according to manual operation.

FIG. 5 is a diagram showing an example of a shift operation device 50. The shift operation device 50 functions as a switching device that switches the shift position $P_{SH}$ among a plurality of positions for the power transmission apparatus 10, according to manual operation. The shift operation device 50 is provided, for example, on the side of a driver's seat The shift operation device 50 includes the shift lever 52 that is operated to select the shift position $P_{SH}$ among the plurality of positions. The shift lever 52 is manually moved to one of a parking position "P (Parking)", a reverse position "R (Reverse)", a neutral position "N (Neutral)", an automatic-shift forward-travel position "D (Drive)", and a manual-shift forward-travel position "M (Manual)". When the shift lever 52 is at the position "P (Parking)", the transmission of power is interrupted in the power transmission path in the power transmission apparatus 10 (the automatic shift portion 20) so that the power transmission apparatus 10 is in the neutral state, and the output shaft 22 of the automatic shift portion 20 is locked. When the shift lever 52 is at the position "R (Reverse)", the vehicle backs up. When the shift lever 52 is at the position "N (Neutral)"; the transmission of power is interrupted in the power transmission path in the power transmission apparatus 10 so that the power transmission apparatus 10 is placed in the neutral state. When the shift lever 52 is at the position "D (Drive)", an automatic shift mode is selected, and an automatic shift control is executed to achieve the total speed ratio $\gamma T$ of the power transmission apparatus 10 in a range in which the total speed ratio $\gamma T$ can be changed. The total speed ratio $\gamma T$ is determined based on the speed ratio of the differential portion 16 and the speed ratio of the automatic shift portion 20 at each gear. The speed ratio of the differential portion 16 is continuously changed in a certain range. The gear of the automatic shift portion 20 is selected among the first gear to the fourth gear by the automatic shift control. When the shift lever 52 is at the position "M (Manual)", a manual shift mode (manual mode) is selected to set so-called shift ranges by restricting the use of the high gear(s) of the automatic shift portion 20 that is (are) used in the automatic shift control.

In the power transmission apparatus 10, when the shift lever 52 is manually moved to the shift position $P_{SH}$, among the above-described positions, for example, the state of the hydraulic control circuit 70 is electrically switched to achieve one of the reverse gear "R", the neutral state "N", the gears in the forward gear "D", and the like shown in the engagement operation table in FIG. 2. Among the positions "P" to "M", each of the positions "P" and "N" is a non-travel position that is selected to stop the vehicle from moving. When the shift lever 52 is at the position "P" or "N", for example, both of the first clutch C1 and the second clutch C2 are disengaged, as shown in the engagement operation table in FIG. 2. That is, each of the positions "P" and "N" is a non-drive position for switching the state of the power transmission path in the automatic shift portion 20 to the power-transmission interrupted state by disengaging the first clutch C1 and the second clutch C2 so that the transmission of the power is interrupted in the power transmission path and the vehicle cannot be driven. Each of the positions "R", "D", and "M" is a travel position that is selected to cause the vehicle to travel. When the shift lever 52 is at the position "R", "D", or "M", for example, at least one of the first clutch C1 and the second clutch C2 is engaged as shown in the engagement operation table in FIG. 2. That is, each of the positions "R", "D", and "M" is a drive position for switching the state of the power transmission path in the automatic shift portion 20 to the power-transmission permitted state by engaging the first clutch C1 and/or the second clutch C2 so that the transmission of power is permitted in the power transmission path and the vehicle can be driven.

In the shift operation device 50 shown in FIG. 5, more specifically, when the shift lever 52 is manually moved from the position "P" or "N" to the position "R", the state of the power transmission path in the automatic shift portion 20 is switched from the power-transmission interrupted state to the power-transmission permitted state by engaging the second clutch C2. When the shift lever 52 is manually moved from the position "N" to the position "D", the state of the power transmission path in the automatic shift portion 20 is switched from the power-transmission interrupted state to the power-transmission permitted state by engaging at least the first clutch C1. When the shift lever 52 is manually moved from the position "R" to the position "P" or "N", the state of the power transmission path in the automatic shift portion 20 is switched from the power-transmission permitted state to the power-transmission interrupted state by disengaging the second clutch C2. When the shift lever 52 is manually moved from the position "D" to the position "N", the state of the power transmission path in the automatic shift portion 20 is switched from the power-transmission permitted state to the power-transmission interrupted state by disengaging the first clutch C1 and the second clutch C2.

Figure 6:
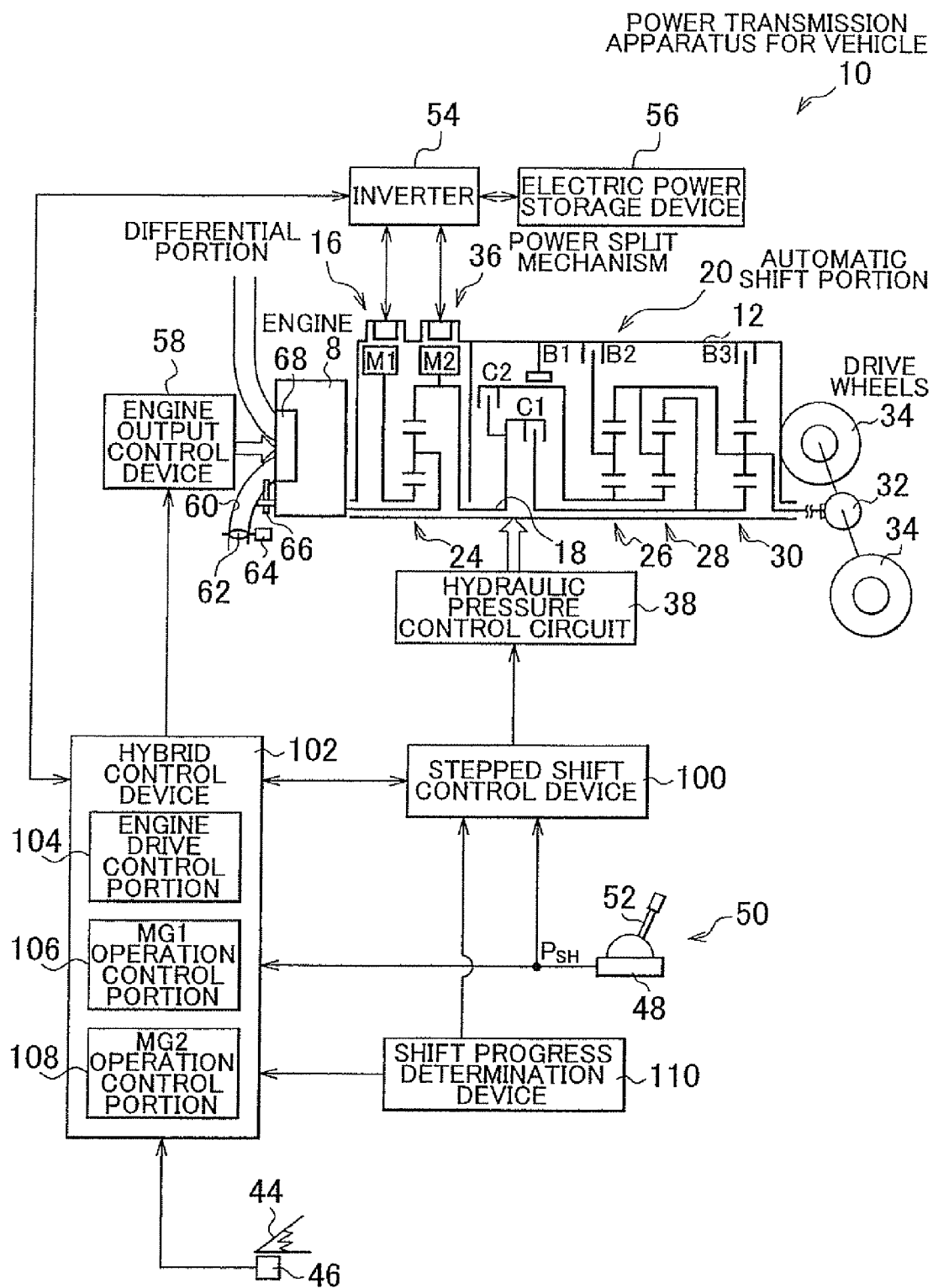
FIG. 6 is a function block diagram explaining main control functions of the electronic control unit shown in FIG. 4.

FIG. 6 is a function block diagram explaining the main control functions of the electronic control unit 40 that is an example of the control device according to the invention. In FIG. 6, a stepped shift control device 100 and a hybrid control device 102 control the speed ratio of the power transmission apparatus 10, by controlling the power split mechanism 36 and the automatic shift portion 20 of the power transmission apparatus 10. That is, the stepped shift control portion 100 controls automatic stepwise shift of the automatic shift portion 20 that may be regarded as the second shift portion, through the hydraulic control circuit 38 that will be described in detail below. The hybrid control device 102 controls the speed ratio of the power split mechanism 36 by controlling the drive of the engine 8, the first motor M1, and the second motor M2, through an inverter 54, the engine output control device 58, and the like.

Figure 7:
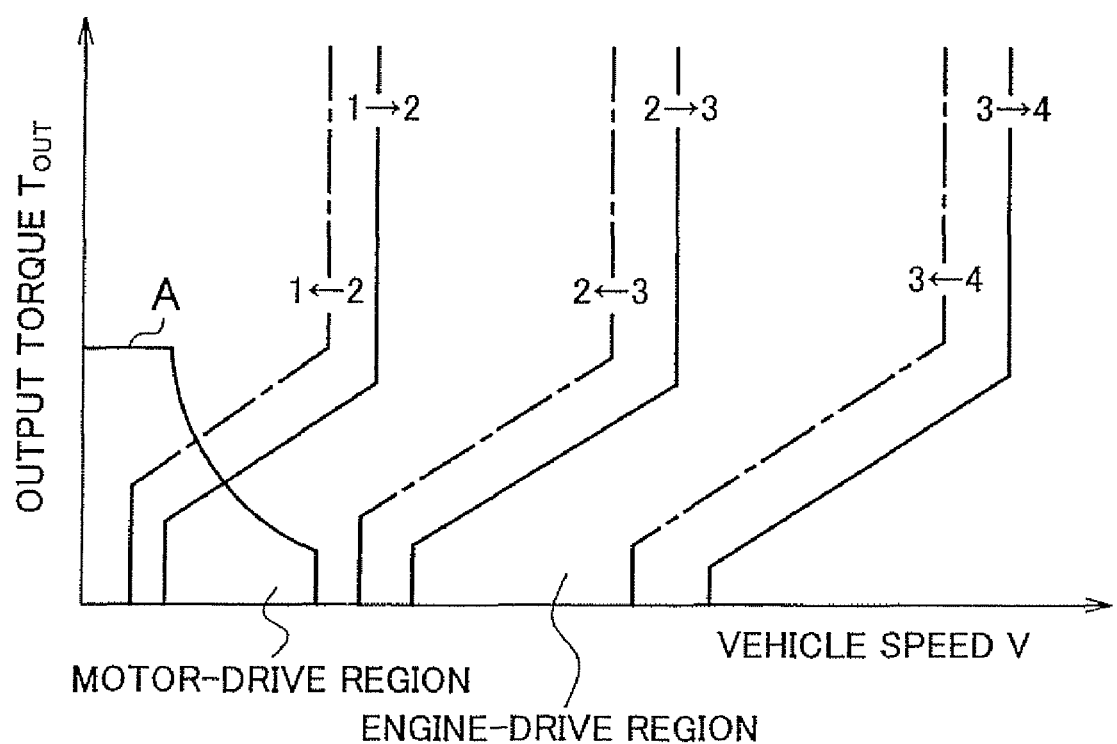
FIG. 7 shows an example of a prestored relational diagram used to determine a gear of the automatic shift portion, and to determine whether a drive mode should be switched from a motor-drive mode to an engine-drive mode or from the engine-drive mode to the motor-drive mode, a vehicle speed and torque output from the automatic shift portion being used as parameters, and upshift lines and downshift lines being provided.

The stepped shift control device 100 determines whether the automatic shift portion 20 should shift, based on the vehicle condition indicated by the actual vehicle speed V and required torque $T_{OUT}$ output from the automatic shift portion 20, using a prestored relational diagram (a shift diagram, a shift map) in which the vehicle speed V and the output torque $T_{OUT}$ are used as parameters, and upshift lines (solid lines) and downshift lines (chain lines) are provided, as shown in FIG. 7. That is, the stepped shift control device 100 determines the gear to which the automatic shift portion 20 should shift, based on the vehicle condition, using the prestored relational diagram. Then, the stepped shift control device 100 executes the automatic shift control on the automatic shift portion 20 through the hydraulic control circuit 38 so that the automatic shift portion 20 shifts to the determined gear. More specifically, the stepped shift control device 100 provides the instruction (i.e., an instruction for starting a shift, or a hydraulic pressure instruction) to the linear solenoid valves SL (not shown) and the like in the hydraulic control circuit 38 to engage and/or disengage the hydraulic frictional engagement devices relating to the shift of the automatic shift portion 20 so that the automatic shift portion 20 shifts to the determined gear according to, for example, the engagement operation table shown in FIG. 2. That is, the stepped shift control device 100 outputs the instruction to the hydraulic control circuit 38 to disengage the engagement device to be disengaged during the shift of the automatic shift portion 20, and to engage the engagement device to be engaged during the shift of the automatic shift portion 20, thereby performing the clutch-to-clutch shift. According to the instruction thus output, in the hydraulic control circuit 38, the hydraulic pressures supplied to the hydraulic actuators for the hydraulic frictional engagement devices, that is, the brakes B and the clutches C, are adjusted using the linear solenoid valves SL (not shown) and the like.

The stepped shift control device 100 may execute a sweep control that changes the torque capacity of the engagement element relating to the shift of the automatic shift portion 20 at a predetermined rate, when the shift of the automatic shift portion 20 is performed. In this case, the stepped shift control device 100 executes a disengagement-side sweep control that decreases (gradually decreases), at a predetermined rate, the torque capacity of the engagement element to be disengaged during the clutch-to-clutch shift. In addition, the stepped shift control device 100 executes an engagement-side sweep control that increases (gradually increases), at a predetermined rate, the torque capacity of the engagement element to be engaged during the clutch-to-clutch shift. More specifically, the stepped shift control device 100 executes a hydraulic pressure control that gradually decreases, at a predetermined rate (for example, as a linear function), the hydraulic pressure for the hydraulic frictional engagement device to be disengaged during the shift of the automatic shift portion 20, and gradually increases, at a predetermined rate (for example, as a linear function), the hydraulic pressure for the hydraulic frictional engagement device to be engaged during the shift of the automatic shift portion 20.

The hybrid control device 102 includes an engine drive control portion 104, an MG1 operation control portion 106, and an MG2 operation control portion 108. The engine drive control portion 104 controls the drive of the engine 8 through the engine output control device 58. The MG1 operation control portion 106 controls the operation of the first motor M1 as the drive power source or the generator, through the inverter 54. The MG2 operation control portion 108 controls the operation of the MG2 as the drive power source or the generator, through the inverter 54. The hybrid control device 102 executes the hybrid drive control by controlling the engine 8, the first motor M1, and the second motor M2 using these control functions.

Also, the hybrid control device 102 functions as a differential portion control device that controls the operation of the power split mechanism 36. The hybrid control device 102 operates the engine 8 efficiently, and controls the speed ratio γ0 of the power split mechanism 36 that functions as the electric CVT, by optimizing the ratio between the drive power provided by the engine 8 and the drive power provided by the second motor M2, and optimizing the reaction force borne by the first motor M1 while the first motor M1 generates electric power. For example, the hybrid control device 102 calculates a target (required) output for driving the vehicle based on the accelerator-pedal operation amount Acc, which indicates the amount of the output required by the driver, and the vehicle speed V at a current time point; calculates a total target output based on the target output for driving the vehicle and a required output for charging the electric power storage device 56; calculates a target engine output so that the total target output can be obtained, taking into account a transfer loss, loads of auxiliary machines, assist torque provided by the second motor M2, and the like; and controls the engine speed $N_E$ and the engine torque $T_E$ of the engine 8 to obtain the engine output that matches the target engine output, and controls the amount of electric power generated by the first motor M1.

Thus, the total speed ratio γT is of the entire power transmission apparatus 10 is determined based on the speed ratio γ of the automatic shift portion 20 controlled by the stepped shift control device 100, and the speed ratio γ0 of the power split mechanism 36 controlled by the hybrid control device 102. That is, the hybrid control device 102 and the stepped shift control device 100 function as the shift control devices that control the total speed ratio γT that is the speed ratio of the entire power transmission apparatus 10, for example, in a shift range corresponding to the shift position $P_{SH}$, through the hydraulic control circuit 38, the engine output control device 58, the first motor M1, the second motor M2, and the like, based on the signal $P_{SH}$ that indicates the shift position, and that is output from a shift position sensor 48 provided in the shift operation device 50 according to the operation of the shift lever 52 performed by the driver.

For example, the hybrid control device 102 executes the hybrid control to improve the power performance, the fuel efficiency, and the like of the power transmission apparatus 10. During this hybrid control, the power split mechanism 36 functions as the electric CVT to coordinate the engine speed $N_E$ that is set to operate the engine 8 efficiently, and the rotational speed of the transmitting member 18 that is set based on the vehicle speed V and the gear of the automatic shift portion 20. That is, the hybrid control device 102 sets the target value of the total speed ratio γT of the power transmission apparatus 10 so that the engine 8 operates according to an optimum fuel efficiency curve. The optimum fuel efficiency curve is empirically obtained in advance in a two-dimension coordinate constituted by the engine speed $N_E$ and the engine torque $T_E$ so that high driveability and high fuel efficiency are achieved when the vehicle is driven in the CVT mode. The optimum fuel efficiency curve is stored. For example, the hybrid control device 102 sets the target value of the total speed ratio γT of the power transmission apparatus 10 to control the engine torque $T_E$ and the engine speed $N_E$ to obtain the engine output that matches the target output. Then, to achieve the target value, the hybrid control device 102 controls the speed ratio γ0 of the power split mechanism 36, taking into the account the gear of the automatic shift portion 20, thereby controlling the total speed ratio γT in a manner such that the total speed ratio γT continuously changes in a range in which the total speed ratio γT can be changed.

At this time, the hybrid control device 102 supplies the electric energy generated by the first motor M1 to the electric power storage device 56 and the second motor M2 through the inverter 54. Therefore, although a large part of the power output from the engine 8 is mechanically transmitted to the transmitting member 18, part of the power output from the engine 8 is consumed by the first motor M1 to generate electric power. That is, part of the power output from the engine 8 is converted to electric energy in the first motor M1. The electric energy is supplied to the second motor M2 through the inverter 54, and the second motor M2 is driven. Thus, mechanical energy is transmitted from the second motor M2 to the transmitting member 18. The devices related to the process from the generation of the electric power to the consumption of the electric power in the second motor M2 constitute an electric path in which part of the power output from the engine 8 is converted to the electric energy, and the electric energy is converted to the mechanical energy. Particularly, when the stepped shift control device 100 executes a shift control on the automatic shift portion 20, the speed ratio of the automatic shift portion 20 is changed in a stepwise manner, and accordingly, the total speed ratio γT of the power transmission apparatus 10 is changed in a stepwise manner from before to after the shift of the automatic shift portion 20.

When the above-described control is executed, because the total speed ratio γT of the power transmission apparatus 10 is changed in a stepwise manner, that is, the total speed ratio γT of the power transmission apparatus 10 is not continuously changed, and is changed to discrete values, the drive torque can be quickly changed, as compared to when the total speed ratio γT is continuously changed. On the other hand, a shift shock may occur, or the engine speed $N_E$ cannot be controlled according to the optimum fuel efficiency curve, and as a result, the fuel efficiency may be deteriorated. Thus, the hybrid control device 102 causes the power split mechanism 36 to shift in synchronization with the shift of the automatic shift portion 20 so that if the speed ratio of the automatic shift portion 20 is increased, the speed ratio of the power split mechanism 36 is decreased, and if the speed ratio of the automatic shift portion 20 is decreased, the speed ratio of the power split mechanism 36 is increased, to suppress the stepwise change in the total speed ratio γT. In other words, the hybrid control device 102 executes the shift control on the power split mechanism 36 in synchronization of the shift control on the automatic shift portion 20 so that the total speed ratio γT of the power transmission apparatus 10 is continuously changed from before to after the shift of the automatic shift portion 20. For example, the hybrid control device 102 executes the shift control on the power split mechanism 36 in synchronization of the shift control on the automatic shift portion 20 so that the total speed ratio γT of the power transmission apparatus 10 is not transiently changed from before to after the shift of the automatic shift portion 20, and a predetermined total speed ratio γT is achieved. In this case, the hybrid control device 102 executes the shift control on the power split mechanism 36 in synchronization of the shift control on the automatic shift portion 20 so that if the speed ratio of the automatic shift portion 20 is increased in a stepwise manner by an amount, the speed ratio of the power split mechanism 36 is decreased in a stepwise manner by the amount, and if the speed ratio of the automatic shift portion 20 is decreased in a stepwise manner by an amount, the speed ratio of the power split mechanism 36 is increased in a stepwise manner by the amount.

Also, the hybrid control device 102 controls the rotational speed of the engine 8 through the first motor M1 using the electric CVT function of the power split mechanism 36, regardless of whether the vehicle is stopped or the vehicle is traveling. For example, the hybrid control device 102 maintains the engine speed $N_E$ at a substantially constant value, or controls the engine speed $N_E$ to a given value, by controlling the rotational speed $N_{M1}$ of the first motor M1. For example, as shown in the collinear diagram in FIG. 3, when the engine speed $N_E$ is increased while the vehicle is traveling, the hybrid control device 102 increases the rotational speed $N_{M1}$ of the first motor M1, while maintaining the rotational speed $N_{M2}$ of the second motor M2, which is related to the vehicle speed V (the rotational speed of the drive wheels 34), at a substantially constant value.

Also, the hybrid control device 102 (the engine drive control portion 104) executes an output control on the engine 8 so that the engine 8 generates the required output, by outputting at least one of the instruction for controlling opening/closing of the electronic throttle valve 62 using the throttle actuator 64 in the throttle control, the instruction for controlling the amount of fuel injected by the fuel injection device 66, and the timing at which fuel is injected by the fuel injection device 66 in the fuel injection control, and the instruction for controlling the timing at which the fuel is ignited by the ignition device 68, such as the igniter, in the ignition timing control, to the engine output control device 58. For example, the hybrid control device 102 basically executes the throttle control to drive the throttle actuator 60 based on the accelerator-pedal operation amount Acc according to a prestored relation (not shown). That is, the hybrid control device 84 basically executes the throttle control to increase the throttle-valve opening amount $\theta_{TH}$ as the accelerator-pedal operation amount Acc increases. The engine output control device 58 executes the engine torque control, for example, by controlling the opening/closing of the electronic throttle valve 62 using the throttle actuator 64 in the throttle control, controlling the fuel injection performed by the fuel injection device 66 in the fuel injection control, and controlling the timing at which the fuel is ignited by the ignition device 68, such as the igniter, in the ignition timing control, according to the instruction provided by the engine drive control portion 104.

Also, the hybrid control device 102 can drive the vehicle in a motor-drive mode (an electric vehicle (EV) mode), using the electric CVT function (differential action) of the power split mechanism 36, regardless of whether the engine 8 is stopped or idling. For example, the hybrid control device 102 determines whether the vehicle condition is in the motor-drive region or the engine-drive region, based on the vehicle condition indicated by the actual vehicle speed V and the required torque $T_{OUT}$ output from the automatic shift portion 20, using a prestored relational diagram (a drive power source switching diagram, a drive power source map) as shown in FIG. 7. In the relational diagram, the vehicle speed V and the required torque $T_{OUT}$ output from the automatic shift portion 20 are used as parameters. The relational diagram as shown in FIG. 7 includes a boundary line between the engine-drive region and the motor-drive region, which is provided to switch the drive power source for driving the vehicle between the engine 8 and the second motor M2. Then, the hybrid control device 102 drives the vehicle in the motor-drive mode or the engine-drive mode. For example, the drive power source switching diagram indicated by the solid line A in FIG. 7 is prestored, along with the shift map indicated by the solid lines and chain lines in FIG. 7. As evident from FIG. 7, for example, the hybrid control device 102 drives the vehicle in the motor-drive mode in a relatively low output torque $T_{OUT}$ region, that is, in a low engine torque $T_E$ region where the engine efficiency is generally lower than that in a high torque region, or in a low vehicle speed region where the vehicle speed V is low, that is, a low load region.

When the vehicle is driven in the motor-drive mode, the hybrid control device 102 executes the control to suppress the drag of the engine 8 that is stopped, and to improve fuel efficiency. That is, when the vehicle is driven, in the motor-drive mode, the hybrid control device 102 controls the first motor M1 so that the rotational speed $N_{M1}$ of the first motor M1 is a negative value, for example, the hybrid control device 102 places the first motor M1 in a no-load state so that the first motor M1 is idling, thereby maintaining the engine speed $N_E$ at zero or substantially zero using the electric CVT function (differential action) of the power split mechanism 36, as required. Even when the vehicle is driven in the engine-drive mode, the hybrid control device 102 can perform a so-called torque-assist operation to assist the engine 8, by supplying the electric energy to the second motor M2 from the first motor M1 via the electric path, and/or from the electric power storage device 56, and by driving the second motor M2 to apply torque to the drive wheels 34. Also, the hybrid control device 102 can place the first motor M1 in a no-load state to permit the first motor M1 to idle. In this case, torque cannot be transmitted in the power split mechanism 36, that is, the transmission of power is substantially interrupted in the power transmission path in the differential portion 16, and no output is output from the differential portion 16. That is, the hybrid control device 102 can place the power split mechanism 36 in the neutral state so that the transmission of power is electrically interrupted in the power transmission path in the power split mechanism 36, by placing the first motor M1 in the no-load state.

Thus, in the drive power source map as shown in FIG. 7, the motor-drive region is set to the relatively low output torque $T_{OUT}$ region where the engine efficiency is generally lower than that in the high torque region, or in the low vehicle speed region where the vehicle speed V is low, that is, the low load region. Although not shown in FIG. 7, when the shift lever 52 is at the position "R", that is, when the vehicle backs up, because the vehicle travels at a relatively low vehicle speed, the vehicle is driven using the second motor M2, without using the engine 8. Accordingly, for example, when the vehicle travels at a relatively low predetermined vehicle speed, or the vehicle is stopped, and the shift lever 52 is moved from the position "N" to the position "D", or the position "R", that is, "a garage shift" (a shift from the position "N" to the position "D", a shift from the position "N" to the position "R", or a shift from the position "P" to the position "R") is performed, the hybrid control device 102 executes the control so that the vehicle is driven by the power from the motor, instead of the power from the engine.

Referring to FIG. 6 again, when the automatic shift portion 20, which may be regarded as the second shift portion, shifts, a shift progress determination device 110 determines whether the degree of progress of the shift of the automatic shift portion 20 has reached a predetermined level. The shift progress determination device 110 may make the determination according to whether an inertia phase of the shift whose progress degree is to be determined (hereinafter, referred to as "subject shift") has started. That is, if the inertia phase of the subject shift has not started, the shift progress determination device 110 determines that the degree of the progress of the subject shift has not reached the predetermined level. The determination may be made based on the torque capacity of the engagement element to be disengaged during the subject shift. That is, if the torque capacity of the engagement element to be disengaged during the subject shift (for example, the second brake B2 when the shift from the second gear to the third gear is performed) is equal to or larger than a predetermined value, the shift progress determination device 110 determines that the degree of the progress of the subject shift has not reached the predetermined level. The determination may be made based on an elapsed time after the start of the subject shift. That is, if the elapsed time after the start of the subject shift is shorter than a predetermined time, the shift progress determination device 110 determines that the degree of the progress of the subject shift has not reached the predetermined level. The determination may be made based on an elapsed time after the start of the inertia phase of the subject shift. That is, if the elapsed time after the start of the inertia phase of the subject shift is shorter than a predetermined time, the shift progress determination device 110 determines that the degree of the progress of the subject shift has not reached the predetermined level. The above-described degree of the progress may be determined based on an amount of change in the rotational speed of the members of the automatic shift portion 20.

For example, when the vehicle is driven in the motor-drive mode using solely the motor M as the drive power source, the engine drive control portion 104 determines whether the engine 8 should be started, based on the operation amount (the amount of depression) of the accelerator pedal 44. For example, when the accelerator-pedal operation amount Acc, which is the operation amount of the accelerator pedal 44, and which is supplied from the accelerator-pedal operation amount sensor 46, is equal to or larger than a predetermined value, the engine drive control portion 104 determines that the engine 8 should be started. That is, for example, when the vehicle is driven using solely the motor M as the drive power source, the engine drive control portion 104 functions as an engine start determination portion that determines whether the engine 8 should be started.

In the case where the vehicle is being driven in the motor-drive mode, using solely the motor M as the drive power source, when an upshift of the automatic shift portion 20 is being performed, the degree of the progress of the upshift has not reached the predetermined level, and it is determined that the engine 8 should be started based on, for example, the depression of the accelerator pedal 44, the stepped shift control device 100 and the hybrid control device 102 execute the control that stops the upshift, and starts the engine 8. That is, in the case where the vehicle is driven in the motor-drive mode using solely the motor M as the drive power source according to the control executed by the hybrid control device 102, and the upshift of the automatic shift portion 20 is being performed according to the control executed by the stepped shift control device 100, when the shift progress determination device 110 makes a negative determination, and the accelerator-pedal operation amount Acc, which is the operation amount of the accelerator pedal 44, and which is supplied from the accelerator-pedal operation amount sensor 46, is equal to or larger than the predetermined value, and therefore, the hybrid control device 102 (the engine drive control portion 104) determines that the engine 8 should be started, the control is executed to stop the upshift, which is being performed according to the control of the stepped shift control device 100, and to start the engine 8.

Also, in the case where the vehicle is driven in the motor-drive control using solely the motor M, when the upshift of the automatic shift portion 20 is being performed, the degree of the progress of the upshift has not reached the predetermined level, and it is determined that the engine 8 should be started based on, for example, the depression of the accelerator pedal 44, the stepped shift control device 100 and the hybrid control device 102 execute the control that stops the upshift, starts a downshift of the automatic shift portion 20, and starts the engine 8. That is, in the case where the vehicle is driven in the motor-drive mode using solely the motor M as the drive power source according to the control executed by the hybrid control device 102, and the upshift of the automatic shift portion 20 is being performed according to the control executed by the stepped shift control device 100, when the shift progress determination device 110 makes a negative determination, and the accelerator-pedal operation amount Acc, which is the operation amount of the accelerator pedal 44, and which is supplied from the accelerator-pedal operation amount sensor 46, is equal to or larger than the predetermined value, and therefore, the hybrid control device 102 (the engine drive control portion 104) determines that the engine 8 should be started, the control is executed to stop the upshift, which is being performed according to the control of the stepped shift control device 100, to start a downshift of the automatic shift portion 20, and to start the engine 8. When the upshift from the second gear toward the third gear is stopped, the downshift from the third gear to the second gear may be performed. When the upshift from the third gear toward the fourth gear is stopped, the downshift from the fourth gear to the third gear may be performed. That is, the downshift may be a shift to a gear, which is achieved before the upshift is performed and stopped.

Figure 8:
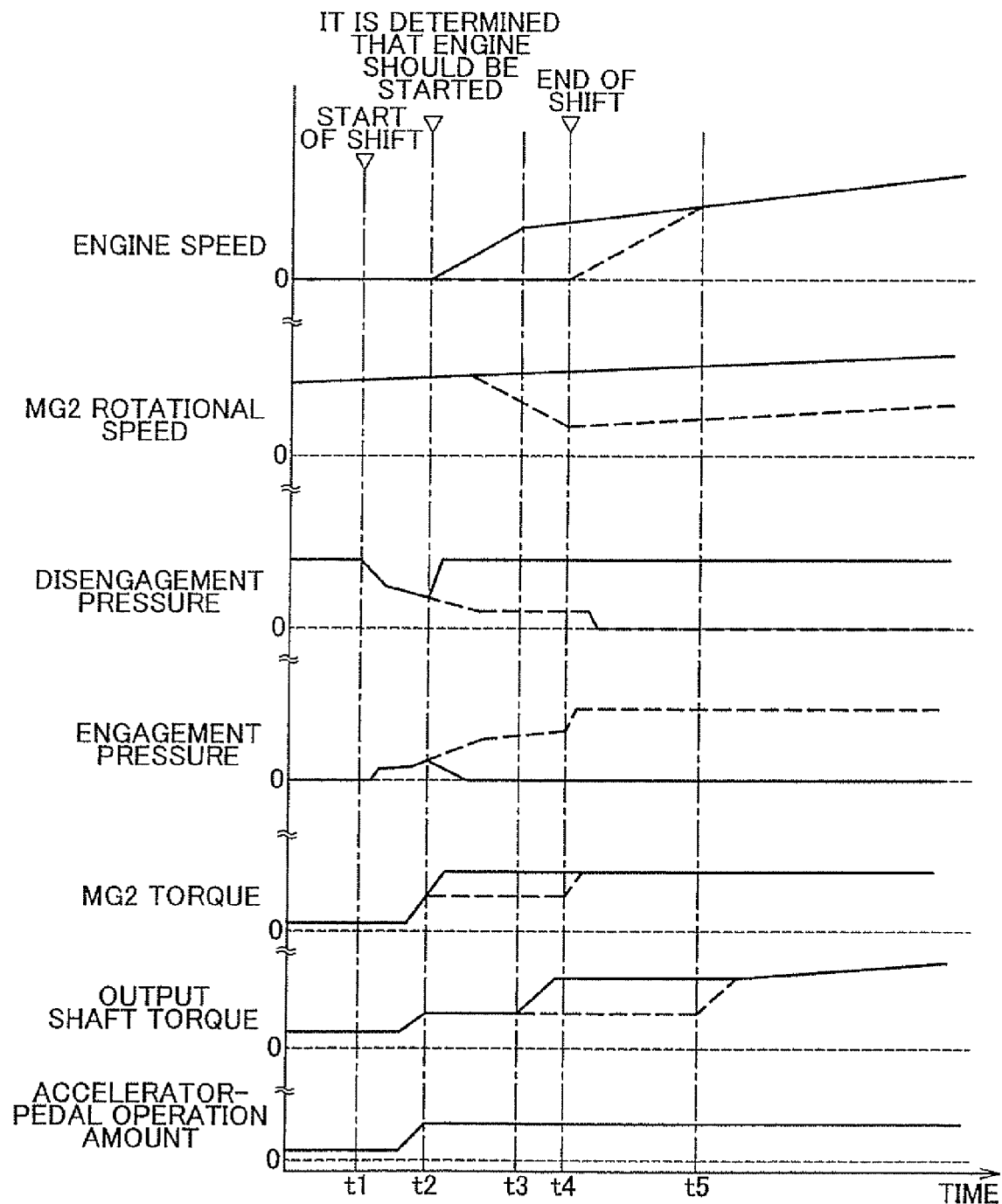
FIG. 8 is a time chart explaining a shift-time engine start control executed by the electronic control unit shown in FIG. 4, FIG. 8 showing a mode in which a degree of progress of a subject shift is determined based on whether the inertia phase of the subject shift has started.

FIG. 8 is a time chart explaining a shift-time engine start control executed by the stepped shift control device 100 and the hybrid control device 102. FIG. 8 shows an example of a mode in which the degree of the progress of the subject shift is determined based on whether the inertia phase of the subject shift has started. Also, in FIG. 8, the solid line indicates a value in each portion when the control in the embodiment is executed, and the dashed line indicates a value in each portion when a control in a comparative example is executed. In the example shown in FIG. 8, first, at time point t1, the upshift of the automatic shift portion 20 starts. Accordingly, the control is started to gradually decrease a disengagement pressure, that is, the hydraulic pressure for the actuator for the engagement element to be disengaged. In addition, the control is started to gradually increase an engagement pressure, that is, the hydraulic pressure for the actuator for the engagement element to be engaged. Then, the accelerator pedal 44 is depressed, and thus, the accelerator-pedal operation amount Acc supplied from the accelerator-pedal operation, amount sensor 46 becomes equal to or larger than the predetermined value. Accordingly, at time point t2, it is determined that the engine 8 should be started. In the control in the comparative example shown by the dashed lines, the start of the engine 8 is delayed until the upshift of the automatic shift portion 20 is stopped at time point 4. Therefore, the control that increases the rotational speed of the engine 8 is executed from time point t4 to time point t5. At time point t5, the torque of the output shaft starts to increase as a result of the engine 8 being started. Accordingly, the drive power corresponding to the depression of the accelerator pedal 44 is not quickly output, and thus, the driver feels that the drive power is not quickly increased, and the drive power is insufficient. In contrast, in the control in the embodiment shown by the solid lines, it is determined whether the inertia phase of the upshift that is being performed has started, at time point t2 at which it is determined that the engine 8 should be started. In the control shown in FIG. 8, because the inertia phase has not started at time point t2, the upshift is stopped, and the disengagement pressure starts to gradually increase, and the engagement pressure starts to gradually decrease. Also, the engine 8 is started around the time point at which the upshift is stopped. Thus, the control that increases the rotational speed of the engine 8 is executed from time point t2 to time point t3. Accordingly, at time point t3, the torque of the output shaft starts to increase as a result of the engine 8 being started. Thus, the drive power is output in quick response to the depression of the accelerator pedal 44 by the driver.

Figure 9:
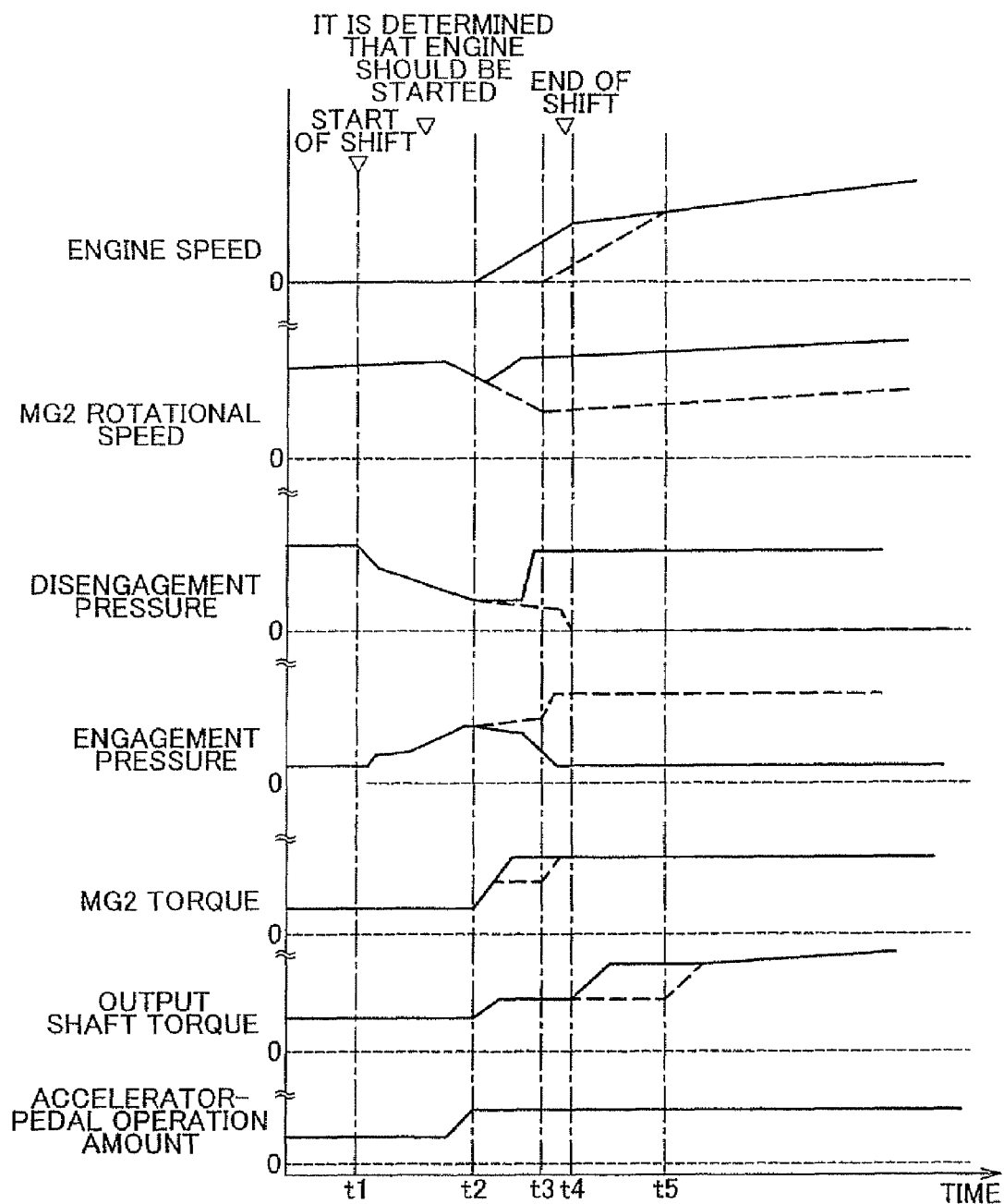
FIG. 9 is a time chart explaining a shift-time engine start control executed by the electronic control unit shown in FIG. 4, FIG. 9 showing a mode in which the degree of the progress of a subject shift is determined based on a torque capacity of an engagement element to be disengaged during the subject shift.

FIG. 9 is a time chart explaining a shift-time engine start control executed by the stepped shift control device 100 and the hybrid control device 102. FIG. 9 shows an example of a mode in which the degree of the progress of the subject shift is determined based on the torque capacity of the engagement element to be disengaged during the subject shift. Also, in FIG. 9, the solid line indicates a value in each portion when the control in the embodiment is executed, and the dashed line indicates a value in each portion when a control in related art is executed, as in FIG. 8. In the control shown in FIG. 9, first, at time point t1, the upshift of the automatic shift portion 20 starts. Accordingly, the control is started to gradually decrease the disengagement pressure, that is, the hydraulic pressure for the actuator for the engagement element to be disengaged. In addition, the control is started to gradually increase the engagement pressure, that is, the hydraulic pressure for the actuator for the engagement element to be engaged. Then, the accelerator pedal 44 is depressed, and thus, the accelerator-pedal operation amount Acc supplied from the accelerator-pedal operation amount sensor 46 becomes equal to or larger than the predetermined value. Accordingly, at time point t2, it is determined that the engine 8 should be started. In the control in the related art shown by the dashed lines, the start of the engine 8 is delayed until the upshift of the automatic shift portion 20 is stopped at time point 3. Therefore, the control that increases the rotational speed of the engine 8 is executed from time point t3 to time point t5. At time point t5, the torque of the output shaft starts to increase as a result of the engine 8 being started. Accordingly, the drive power corresponding to the depression of the accelerator pedal 44 is not quickly output, and thus, the driver feels that the drive power is not quickly increased, and the drive power is insufficient. In contrast, in the control in the embodiment shown by the solid lines, it is determined whether the torque capacity of the engagement element to be disengaged during the upshift is smaller than a predetermined value, at time point t2 at which it is determined that the engine 8 should be started. In the control shown in FIG. 9, because the torque capacity of the engagement element to be disengaged is equal to or larger than the predetermined value at time point t2, the upshift is stopped, and the disengagement pressure starts to gradually increase, and the engagement pressure starts to gradually decrease. Also, the engine 8 is started around the time point at which the upshift is stopped. Thus, the control that increases the rotational speed of the engine 8 is executed from time point t2 to time point t4. Accordingly, at time point t4, the torque of the output shaft starts to increase as a result of the engine 8 being started. Thus, the drive power is output in quick response to the depression of the accelerator pedal 44 by the driver.

The criterion, which is used when the shift progress determination device 110 determines the degree of the progress of the shift, may be changed based on the temperature of oil, that is, the temperature of the automatic transmission fluid in the automatic shift portion 20. FIG. 10 is a diagram showing an example of a relation between the temperature of the oil in the automatic shift portion 20, and a criterion value of the elapsed time after the start of the shift, which is one example of the criterion value used to determine the degree of the progress of the shift. If the elapsed time after the start of the subject shift, whose progress degree is to be determined, is shorter than the criterion value of the elapsed time, the shift progress determination device 110 determines that the degree of the progress of the shift has not reached the predetermined level. As shown in FIG. 10, the criterion value of the elapsed time after the start of the shift, which is the criterion used when the shift progress determination device 110 determines the degree of the progress of the shift, is set to decrease, as the temperature of the oil in the automatic shift portion 20 increases. The criterion value of the elapsed time after the start of the shift is set in the above-described manner, because the response of the automatic shift portion 20 changes according to the viscosity of the operating oil that changes according to the temperature of the oil in the automatic shift portion 20. By appropriately set the criterion used to determine the degree of the progress of the shift according to the temperature of the oil in the automatic transmission portion 20, it is possible to appropriately determine whether the degree of the progress, of the shift has reached the predetermined level when the shift of the automatic shift portion 20 is performed.

Figure 11:
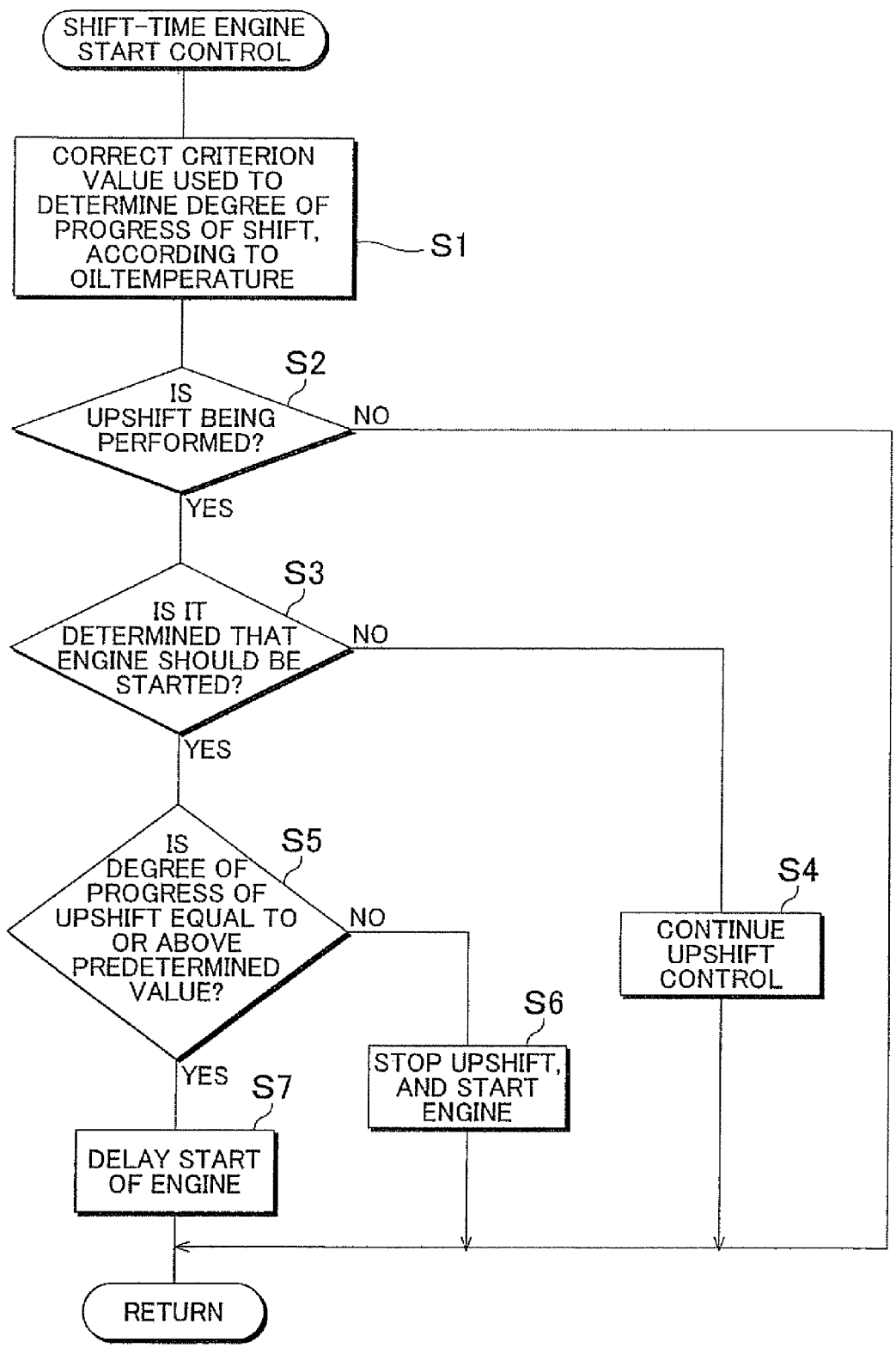
FIG. 11 is a flowchart explaining a main part of the shift-time engine start control executed by the electronic control unit shown in FIG. 4.

FIG. 11 is a flowchart explaining a main part of the shift-time engine start control executed by the electronic control unit 40. The shift-time engine start control is repeatedly executed at predetermined intervals.

First, in step S1, the criterion used to determine the degree of the progress of the shift is corrected (changed) according to the temperature of the automatic transmission fluid. Next, in step S2, it is determined whether an upshift of the automatic shift portion 20 is being performed. When a negative determination is made in step S2, the routine ends. When an affirmative determination is made in step S2, it is determined whether the engine 8 should be started based on, for example, whether the accelerator-pedal operation amount Acc supplied from the accelerator-pedal operation amount sensor 46 is equal to or larger than a predetermined value. When a negative determination is made in step S3, the upshift control that causes the automatic shift portion 20 to upshift is continued, and then, the routine ends. When an affirmative determination is made in step S3, it is determined whether the degree of the progress of the upshift of the automatic shift portion 20 is equal to or above a predetermined value in step S5. More specifically, it is determined whether the inertia phase of the upshift has started, whether the torque capacity of the engagement element to be disengaged is smaller than a predetermined value, whether a predetermined time has elapsed after the start of the upshift, or whether a predetermined time has elapsed after the start of the inertia phase of the upshift. When a negative determination is made in step S5, that is, it is determined that the degree of the progress of the upshift has not reached a predetermined level, the upshift is stopped and the engine 8 is started in step S6. Then, the routine ends. When an affirmative determination is made in step S5, the upshift is continued, and the start of the engine 8 is delayed. Then, the routine ends. In the above-described control, the processes in steps S4, S6, and S7 may be regarded as the operation performed by the stepped shift control device 100 and the operation of the engine drive control portion 104. The processes in steps S1 and S5 may be regarded as the operation performed by the shift progress determination device 110.

Figure 12:
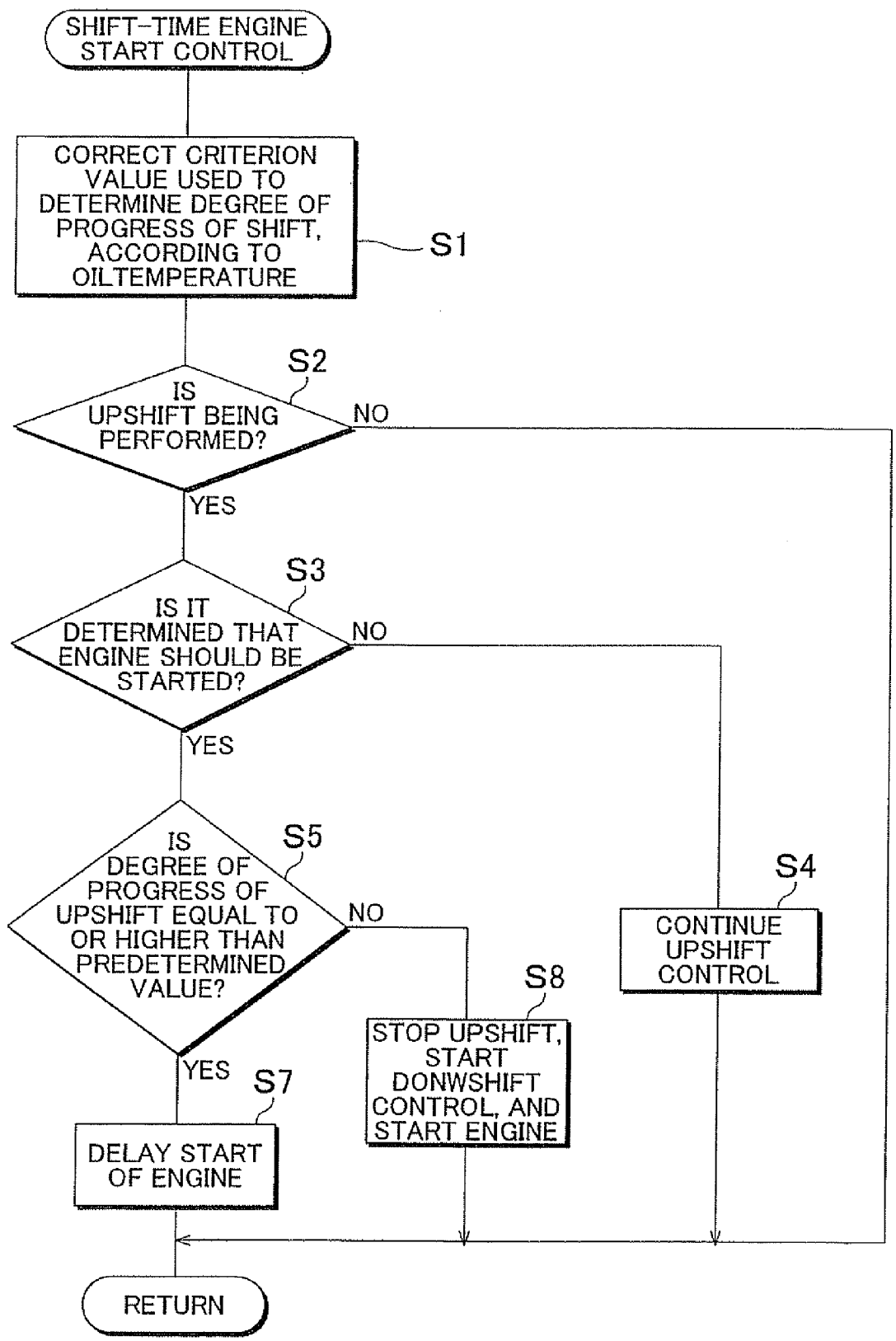
FIG. 12 is a flowchart explaining a main part of another example of the shift-time engine start control executed by the electronic control unit shown in FIG. 4.

FIG. 12 is a flowchart explaining a main part of another example of the shift-time engine start control executed by the electronic control unit 40. The shift-time engine start control is repeatedly executed in predetermined time intervals. In the control shown in FIG. 12, the same steps as those in the control shown in FIG. 11 are denoted by the same step numbers, and the description thereof will be omitted. In the control shown in FIG. 12, when a negative determination is made in step S5, that is, when it is determined that the degree of the progress of the upshift has not reached the predetermined level, the upshift is stopped, and a downshift is started, and the control that starts the engine 8 is started in step S8. Then, the routine ends.

Thus, in the embodiment, the power transmission apparatus 10 includes the engine 8; the power split mechanism 36 that may be regarded as the first shift portion that includes the motor M and the differential portion 16, and that is able to function as the electric differential portion; the automatic shift portion 20 that may be regarded as the second shift portion that is a stepped shift portion, and that is connected to the power split mechanism 36. The power transmission apparatus 10 transmits the power output from the engine 8 to the drive wheels 34. In the system for controlling the power transmission apparatus 10, in the case where the vehicle is being driven using solely the motor M as the drive power source, when an upshift of the automatic shift portion 20 is being performed, the degree of the progress of the upshift has not reached the predetermined level, and it is determined that the engine 8 should be started, the control device for the power transmission apparatus 10 executes the control that stops the upshift, and starts the engine 8. Therefore, even when an upshift of the automatic shift portion 20 is being performed, it is possible to quickly output the drive power according to the depression of the accelerator pedal 44. That is, it is possible to provide the system for controlling the power transmission apparatus 10, which reduces the possibility that the driver feels that the drive power is not quickly increased, and the drive power is insufficient when the driver depresses the accelerator pedal 44.

Also, when the vehicle is driven using solely the motor M as the drive power source, an upshift of the automatic shift portion 20 is being performed, the degree of the progress of the upshift has not reached the predetermined level, and it is determined that the engine 8 should be started, the control device executes the control that stops the upshift, starts a downshift of the automatic shift portion 20, and starts the engine 8. Therefore, even when an upshift of the automatic shift portion 20 is being performed, it is possible to quickly output the drive power according to the depression of the accelerator pedal 44. That is, it is possible to provide the system for controlling the power transmission apparatus 10, which reduces the possibility that the driver feels that the drive power is not quickly increased, and the drive power is insufficient when the driver depresses the accelerator pedal 44.

Also, if the inertia phase of the upshift has not started, it is determined that the degree of the progress of the upshift has not reached the predetermined level. If the inertia phase of the upshift has not started, the rotational speed of the members of the automatic shift portion 20 has not changed, and therefore, it is possible to determine that a shock will not occur even if the upshift is stopped. Accordingly, the upshift is stopped, and the engine 8 is started. If the inertia phase has started, the upshift is continued. Thus, it is possible to appropriately suppress occurrence of a shock.

Also, if the torque capacity of the engagement element to be disengaged during the upshift is equal to or larger than the predetermined value, it is determined that the degree of the progress of the upshift has not reached the predetermined level. If the torque capacity of the engagement element to be disengaged during the upshift is equal to or larger than the predetermined value, it is possible to determine that a shock will not occur even if the upshift is stopped, and therefore, the upshift is stopped, and the engine 8 is stopped. If the toque capacity is smaller than the predetermined value, the upshift is continued. Thus, it is possible to appropriately suppress an occurrence of a shock.

Also, if the elapsed time after the start of the upshift is shorter than the predetermined time, it is determined that the degree of the progress of the upshift has not reached the predetermined level. If the elapsed time after the start of the upshift is shorter than the predetermined time, it is possible to determine that a shock will not occur even if the upshift is stopped, and therefore, the upshift is stopped, and the engine 8 is started. If the elapsed time after the start of the upshift is equal to or longer than the predetermined time, the upshift is continued. Thus, it is possible to appropriately suppress an occurrence of a shock.

Also, if the elapsed time after the start of the inertia phase of the upshift is shorter than the predetermined time, it is determined that the degree of the progress of the upshift has not reached the predetermined level. If the elapsed time after the start of the inertia phase of the upshift is shorter than the predetermined time, it is possible to determine that a shock will not occur even if the upshift is stopped, and therefore, the upshift is stopped, and the engine 8 is started. If the elapsed time after the start of the inertia phase is equal to or longer than the predetermined time, the upshift is continued. Thus, it is possible to appropriately suppress an occurrence of a shock.

Also, the degree of the progress of the upshift is determined based on the amount of change in the rotational speed of the members of the automatic shift portion 20. Therefore, it is possible to determine the progress of the upshift in a practical manner.

Also, the criterion used to determine the degree of the progress of the upshift is changed based on the temperature of the oil in the automatic shift portion 20. Therefore, it is possible to determine the progress of the upshift in a practical manner.

Also, it is determined whether the engine 8 should be started based on the amount of depression of the accelerator pedal 44. Therefore, it is possible to determine whether the engine 8 should be started in a practical manner.

Also, the automatic shift portion 20 automatically shifts according to the traveling condition of the vehicle. Therefore, when employing the power transmission apparatus 10 that includes the practical stepped automatic shift portion, it is possible to reduce the possibility that the driver feels that the drive power is not quickly increased, and the drive power is insufficient when the driver depresses the accelerator pedal 44.

Also, the power split mechanism 36 includes the first planetary gear unit 24, and the two motors M1 and M2 that are connected to the rotational elements of the first planetary gear unit 24. Therefore, when employing the power transmission apparatus 10 that includes the practical first shift portion, it is possible to reduce the possibility that the driver feels that the drive power is not quickly increased, and the drive power is insufficient when the driver depresses the accelerator pedal 44.

Although the embodiment of the invention has been described in detail with reference to the drawings, the invention is not limited to the embodiment. The invention may be implemented in other embodiments.

For example, in the above-described embodiment, the second motor M2 is connected to the third rotational element RE3 that is the input rotational element of the automatic shift portion 20 so that power is transmitted between the second motor M2 and the third rotational element RE3. However, the invention is not limited to the configuration. The second motor M2 may be connected to any one of the rotational elements of the automatic shift portion 20 so that power is transmitted between the second motor M2 and the rotational element. That is, the second motor M2 may be provided at any position in the power transmission path between the engine 8 and the drive wheels 34.

Also, in the above-described embodiment, the invention is applied to the power transmission apparatus 10 including the automatic shift portion 20 that functions as the mechanical power transmission portion, and that is the transmission in which one of the first to fourth gears is selectively achieved. However, for example, the invention may be applied to a power transmission apparatus that includes an automatic shift portion with a simpler configuration, for example, an automatic shift portion with three forward gears, or an automatic shift portion in which a larger number of gears can be achieved, for example, an automatic shift portion with five or more forward gears, instead of the automatic shift portion 20.

Further, various modifications may be made to the invention without departing from the scope of the invention.

What is claimed is:

1. A control system, comprising:
a power transmission apparatus that includes an engine; a first shift portion that includes a motor and a differential portion, and that is able to function as an electric differential portion; and a second shift portion that is a stepped shift portion, and that is connected to the first shift portion, wherein the power transmission apparatus transmits power output from the engine to a drive wheel; and
a control device that includes a shift progress determination portion that determines whether a degree of progress of an upshift of the second shift portion that is performed when a vehicle is driven using solely the motor as a drive power source, has reached a predetermined level, wherein the control device determines whether the engine should be started; and when the upshift of the second shift portion is being performed, the shift progress determination portion determines that the degree of the progress of the upshift has not reached the predetermined level, and the control device determines that the engine should be started, the control device executes a control that stops the upshift, and starts the engine.

2. The control system according to claim 1, wherein when the vehicle is driven using solely the motor as the drive power source, the upshift of the second shift portion is being performed, the shift progress determination portion determines that the degree of the progress of the upshift has not reached the predetermined level, and the control device determines that the engine should be started, the control device executes a control that stops the upshift, starts a downshift of the second shift portion, and starts the engine.

3. The control system according to claim 1, wherein if an inertia phase of the upshift has not started, the shift progress determination portion determines that the degree of the progress of the upshift has not reached the predetermined level.

4. The control system according to claim 1, wherein if a torque capacity of an engagement element to be disengaged during the upshift is equal to or larger than a predetermined value, the shift progress determination portion determines that the degree of the progress of the upshift has not reached the predetermined level.

5. The control system according to claim 1, wherein if an elapsed time after start of the upshift is shorter than a predetermined time, the shift progress determination portion determines that the degree of the progress of the upshift has not reached the predetermined level.

6. The power transmission apparatus according to claim 1, wherein if an elapsed time after start of an inertia phase of the upshift is shorter than a predetermined time, the shift progress determination portion determines that the degree of the progress of the upshift has not reached the predetermined level.

7. The control system according to claim 1, wherein the degree of the progress of the upshift is determined based on an amount of change in a rotational speed of a member of the second shift portion.

8. The control system according to claim 1, wherein a criterion used to determine the degree of the progress of the upshift is changed based on a temperature of oil in the second shift portion.

9. The control system according to claim 1, wherein the control device determines whether the engine should be started based on an amount of depression of an accelerator pedal.

10. The control system according to claim 1, wherein the second shift portion automatically shifts according to a traveling state of the vehicle.

11. The control system according to claim 1, wherein the first shift portion includes a planetary gear unit, and two motors connected to rotational elements of the planetary gear unit.

12. The control system according to claim 2, wherein the downshift is a shift to a gear, which is achieved before the upshift is performed and stopped.

13. A control method for a power transmission apparatus for a vehicle, which includes; a first shift portion that includes a motor and a differential portion, and that is able to function as an electric differential portion; and a second shift portion that is a stepped shift portion, and that is connected to the first shift portion, wherein the power transmission apparatus transmits power output from an engine to a drive wheel, the control method comprising:
 determining whether a degree of progress of an upshift of the second shift portion that is performed when a vehicle is driven using solely the motor as a drive power source, has reached a predetermined level;
 determining whether the engine should be started; and
 stopping the upshift, and starting the engine, when it is determined that the degree of the progress of the upshift has not reached the predetermined level, and it is determined that the engine should be started.

14. The control method according to claim 13, further comprising
 stopping the upshift, starting a downshift of the second shift portion, and starting the engine.

15. The control method according to claim 14, wherein the control method is repeatedly executed in predetermined intervals.

* * * * *